(12) United States Patent
Kinoshita

(10) Patent No.: US 11,789,390 B2
(45) Date of Patent: Oct. 17, 2023

(54) SYSTEMS AND METHODS FOR ARRANGING ADJACENT PAGES BASED ON PRINT DATA ASSOCIATED WITH THE PAGES

(71) Applicant: Hidenori Kinoshita, Kanagawa (JP)

(72) Inventor: Hidenori Kinoshita, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 106 days.

(21) Appl. No.: 17/450,590

(22) Filed: Oct. 12, 2021

(65) Prior Publication Data

US 2022/0121145 A1 Apr. 21, 2022

(30) Foreign Application Priority Data

Oct. 15, 2020 (JP) ................. 2020-174211

(51) Int. Cl.
*G03G 15/23* (2006.01)
*G03G 15/00* (2006.01)
*G06K 15/12* (2006.01)
*G06F 40/106* (2020.01)
*G06F 3/12* (2006.01)

(52) U.S. Cl.
CPC ....... *G03G 15/234* (2013.01); *G03G 15/5025* (2013.01); *G03G 15/607* (2013.01); *G06F 3/125* (2013.01); *G06F 40/106* (2020.01); *G06K 15/129* (2013.01)

(58) Field of Classification Search
None
See application file for complete search history.

(56) References Cited

U.S. PATENT DOCUMENTS

| 8,830,491 B2 | 9/2014 | Sato et al. |
| 2005/0243372 A1* | 11/2005 | Sato ................. G06F 3/125 358/1.18 |
| 2011/0116134 A1 | 5/2011 | Farrell et al. |
| 2017/0038717 A1 | 2/2017 | Oki |
| 2020/0341699 A1 | 10/2020 | Kinoshita |

FOREIGN PATENT DOCUMENTS

| JP | 2009-053347 | 3/2009 |
| JP | 4708724 | 6/2011 |

OTHER PUBLICATIONS

Extended European Search Report for 21202225.5 dated Feb. 1, 2022.

* cited by examiner

Primary Examiner — Lennin R Rodriguezgonzalez
(74) Attorney, Agent, or Firm — IPUSA, PLLC

(57) ABSTRACT

An image forming apparatus is configured to arrange a plurality of pages, including a first page and a second page adjacent to the first page, in print data, without providing a margin between adjacent pages in the plurality of pages. The image forming apparatus includes a changer configured to change at least one of a position or an angle of the second page, such that a color of a first edge portion region of the first page and a color of a second edge portion region, adjacent to the first edge portion region, of the second page, satisfy a predetermined condition.

8 Claims, 18 Drawing Sheets

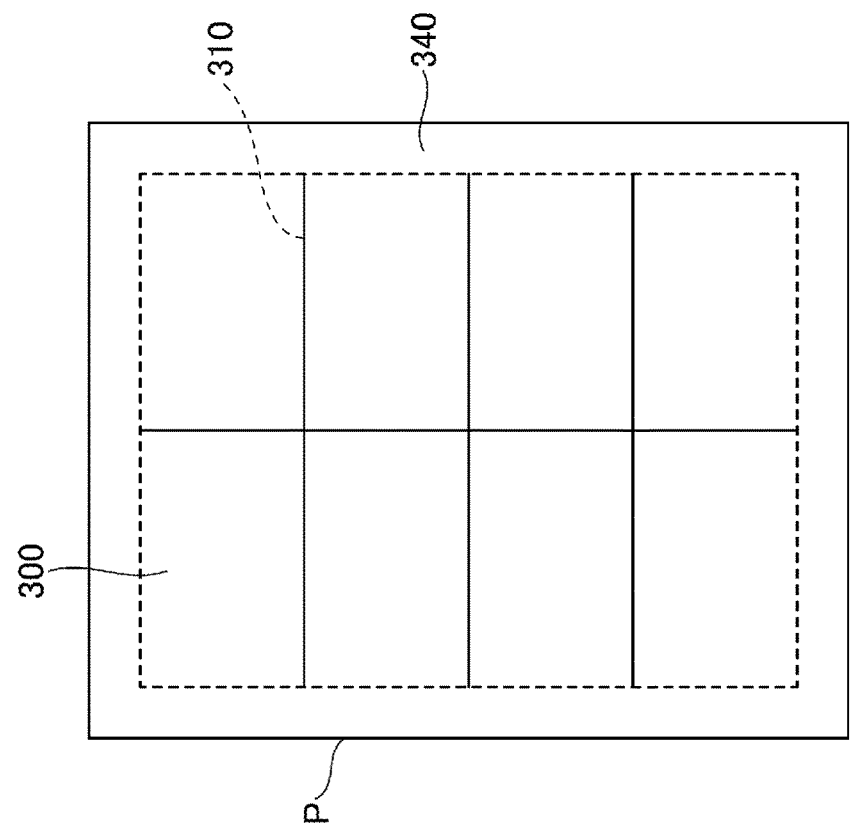

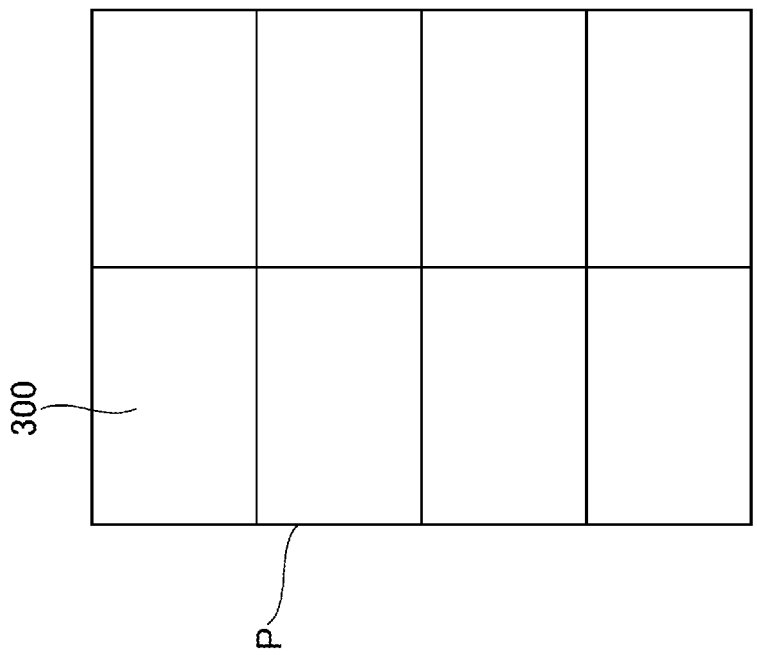
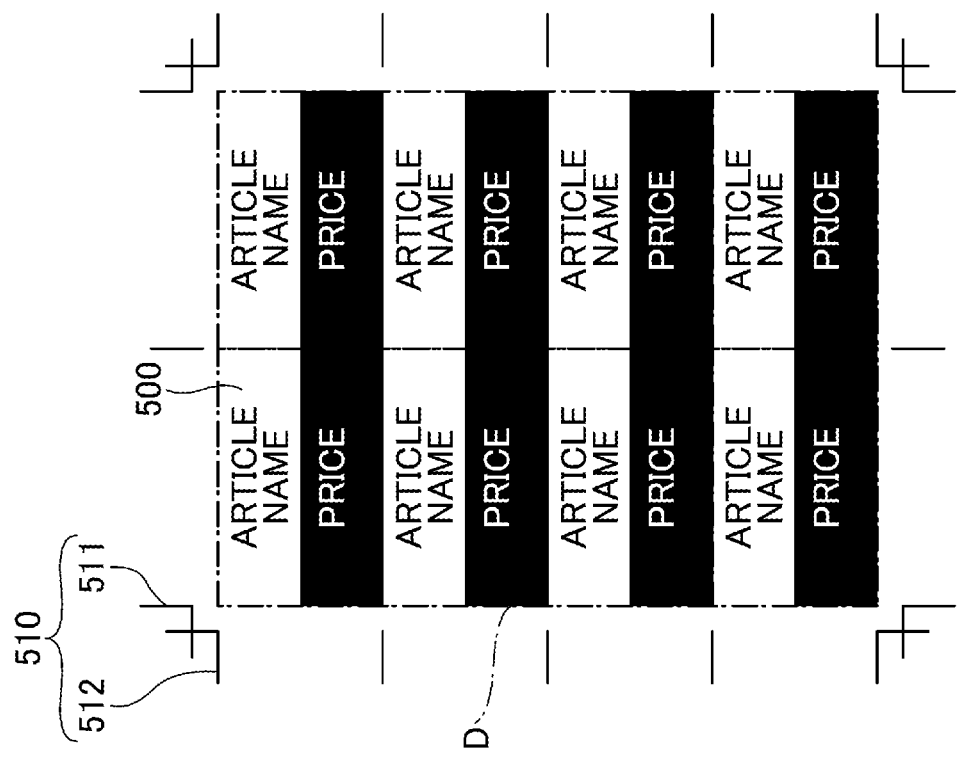

SYSTEMS AND METHODS FOR ARRANGING ADJACENT PAGES BASED ON PRINT DATA ASSOCIATED WITH THE PAGES

CROSS-REFERENCE TO RELATED APPLICATION

The present application is based on and claims priority under 35 U.S.C. § 119 to Japanese Patent Application No. 2020-174211, filed on Oct. 15, 2020, the contents of which are incorporated herein by reference in their entirety.

BACKGROUND OF THE INVENTION

1. Field of the Invention

The present invention relates to an image forming apparatus, an image forming method, and an image forming system.

2. Description of the Related Art

Conventionally, an image forming apparatus that forms images of multiple pages on a single recording medium is known. The recording medium, on which the images of multiple pages are formed, is cut up into each of the pages, after the images are formed.

Further, there is disclosed a configuration which generates print data such that multiple pages are arranged in a predetermined state on a paper sheet, in view of the cutting of the paper sheet after the image formation (see, for example, Patent Document 1).

Patent Document 1: Japanese Unexamined Patent Application Publication No. 2005-309516

SUMMARY OF THE INVENTION

According to one aspect of the present invention, there is provided an image forming apparatus configured to arrange a plurality of pages, including a first page and a second page adjacent to the first page, in print data, without providing a margin between adjacent pages in the plurality of pages, the image forming apparatus including a changer configured to change at least one of a position or an angle of the second page, such that a color of a first edge portion region of the first page and a color of a second edge portion region, adjacent to the first edge portion region, of the second page, satisfy a predetermined condition.

BRIEF DESCRIPTION OF THE DRAWINGS

FIGS. 6A to 6C are diagrams illustrating examples of images of a plurality of pages according to the first embodiment of the present invention, wherein FIG. 6A illustrates an example of 4 panes of postcards continuously printed, FIG. 6B illustrates an example of 20 panes of labels, and FIG. 6C illustrates an example of 10 panes of business-card-sized cards;

FIGS. 7A and 7B are diagrams illustrating a first example of an arrangement of images of a plurality of pages according to the first embodiment of the present invention, wherein FIG. 7A illustrates print data and FIG. 7B illustrates an arrangement of a plurality of pages on a print sheet;

FIGS. 8A and 8B are diagrams illustrating a second example of an arrangement of images of a plurality of pages according to the first embodiment of the present invention, wherein FIG. 8A illustrates print data and FIG. 8B illustrates an arrangement of a plurality of pages on a print sheet;

FIGS. 9A and 9B are diagrams illustrating a third example of an arrangement of images of a plurality of pages according to the first embodiment of the present invention, wherein FIG. 9A illustrates print data with a margin and FIG. 9B illustrates print data without a margin;

FIGS. 10A to 10D are diagrams illustrating examples of a method of determining a color of an edge portion region according to the first embodiment of the present invention, wherein FIG. 10A illustrates the first example, FIG. 10B illustrates the second example, FIG. 10C illustrates the third example, and FIG. 10D illustrates the fourth example;

FIGS. 12A and 12B illustrate a first example of results of changing pages according to the first embodiment of the present invention, wherein FIG. 12A is the figure before the change and FIG. 12B is the figure after the change;

FIGS. 13A and 13B illustrate a second example of results of changing pages according to the first embodiment of the present invention, wherein FIG. 13A is the figure before the change and FIG. 13B is the figure after the change;

FIGS. 15A to 15D are diagrams illustrating examples of an image forming result, wherein FIG. 15A is a diagram illustrating print data according to a comparative example, FIG. 15B is a diagram illustrating an image forming result according to a comparative example, FIG. 15C is a diagram illustrating print data according to the first embodiment of the present invention, and FIG. 15D is a diagram illustrating an image forming result according to the first embodiment of the present invention;

FIGS. 17A and 17B are diagrams illustrating van example of a preview image according to the second embodiment of the present invention, wherein FIG. 17A is a diagram of a print data and FIG. 17B is a diagram of a preview image.

DESCRIPTION OF THE EMBODIMENTS

Figure 1:
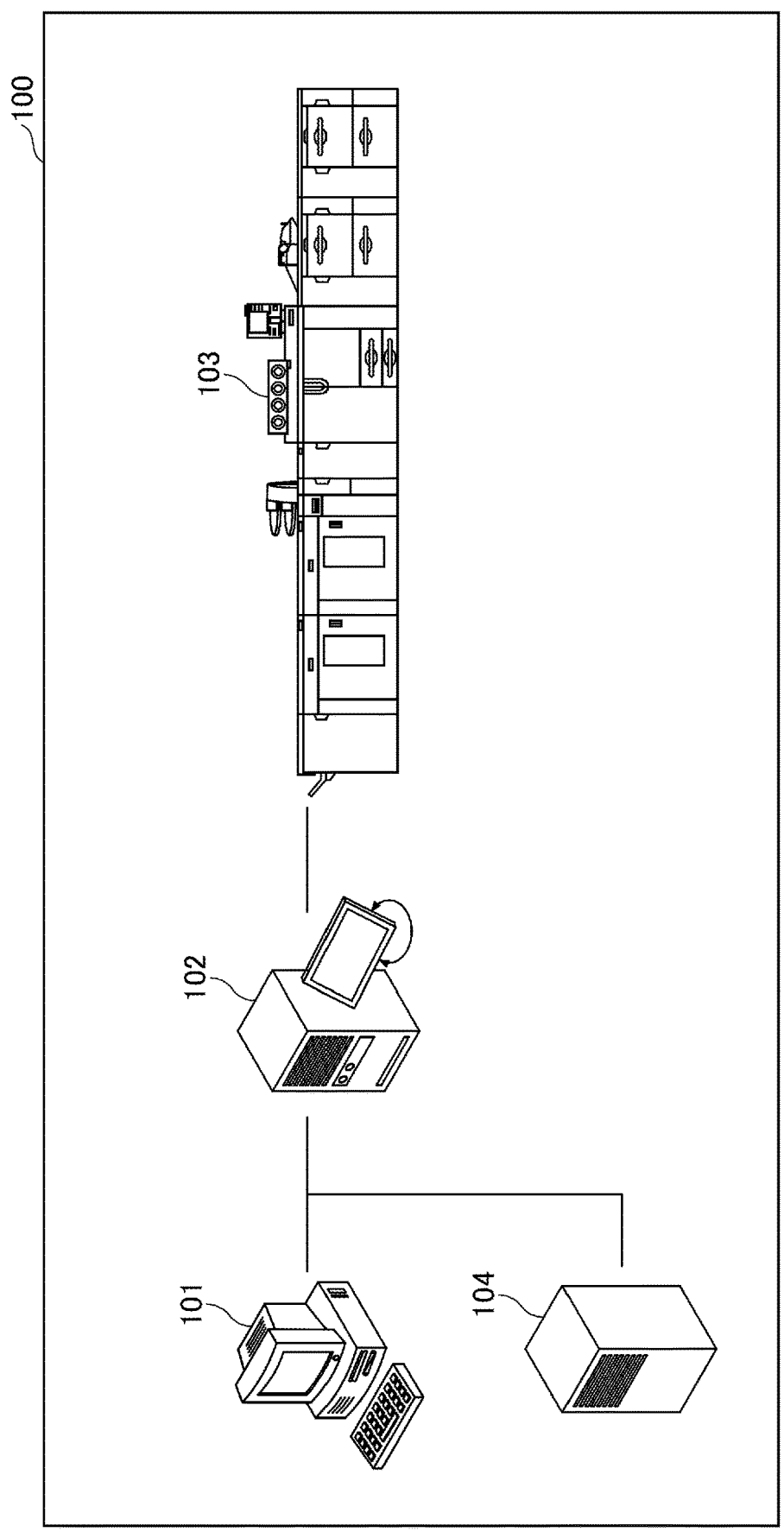
FIG. 1 is a diagram illustrating an example of a configuration of an image forming system according to a first embodiment of the present invention.

In the configuration of Patent Document 1, if images of multiple pages are formed on a single recording medium without providing a margin between adjacent pages, when the recording medium is cut up into each of the pages after the image formation, a portion of an image of another page may be included in one page, and this portion may be noticeable.

A problem to be addressed by an embodiment of the present invention is to prevent a portion of an image of another page, that is included in one page, from being noticeable, when images of multiple pages are formed on a single recording medium without providing a margin between adjacent pages and then the recording medium is cut up into each of the pages.

First Embodiment

Hereinafter, an embodiment for carrying out the present invention will be described with reference to the drawings. In each drawing, the same elements are denoted by the same reference numerals, and overlapping descriptions are omitted accordingly.

The following embodiments illustrate an example of an image forming apparatus for embodying the technical idea of the present invention, and the present invention is not limited to the following embodiments. Unless otherwise specified, the shape, the relative arrangement, and parameter values of the elements described below are not intended to limit the scope of the present invention thereto, but are intended to be examples. Further, the size and positional relationship of the elements illustrated in the drawings may be exaggerated for the purpose of clarification.

The image forming apparatus according to an embodiment forms images of a plurality of pages including a first page and a second page adjacent to the first page, on a single recording medium without providing any margins between adjacent pages, based on print data. For example, the image forming apparatus is for forming images of multiple pages of a postcard size on a single print sheet of an A4-size (recording medium) or the like.

In such an image forming apparatus, the print sheet is cut up into each of the pages after the image formation, and the printed matter is the postcard-sized page that has been cut. However, when cutting the sheet into each of the pages, due to the positional deviation of image formation onto the sheet or due to the positional deviation when cutting the sheet or the like, there may be cases where a portion of the second page is included in the first page and this portion may be noticeable.

For example, when a first edge portion region of the first page has a light color, a portion of a second edge portion region having a dark color of the second page may be included in the first page, at a position adjacent to the first edge portion region having light color, due to the positional deviation of image formation or due to the positional deviation when cutting the sheet or the like. In this case, the portion of the second page included in the first page is noticeable.

In an embodiment, at least one of a position or an angle of the second page in the print data is changed, such that the color of the first edge portion region of the first page and the color of the second edge portion region of the second page adjacent to the first edge portion region satisfy a predetermined condition.

For example, if the first edge portion region of the first page is a light color, at least one of the position or the angle of the second page in the print data is changed such that the color of the second edge portion region of the second page adjacent to the first edge portion region becomes a light color.

Accordingly, even if there is a positional deviation of image formation onto the print sheet or a positional deviation when cutting the sheet or the like, when the print sheet is cut up into each of the pages after the image formation, the first page includes a portion of the second edge portion region having the light color adjacent to the first edge portion region having the light color. Accordingly, the portion of the second page included in the first page will be less noticeable.

Hereinafter, an embodiment will be described as an example of an image forming system including an image forming apparatus according to an embodiment. The image forming system is, for example, an image forming system for commercial printing (production printing) in which a desired image is printed on a large amount of print sheets. The terms "printing", "image forming", and "character printing" in the embodiments are synonymous.

A print sheet is an example of a recording medium. However, the recording medium is not limited to a print sheet. The recording medium may be coated paper, cardboard, an Overhead Projector (OHP) sheet, a plastic film, prepreg, copper foil, or the like, as long as images can be formed (recorded) on the medium.

Example of Overall Configuration of an Image Forming System 100

First, an example of the configuration of the image forming system 100 including an image forming apparatus 103 according to the embodiment will be described with reference to FIG. 1. FIG. 1 is a diagram illustrating an example of a configuration of the image forming system 100. As illustrated in FIG. 1, the image forming system 100 includes a client Personal Computer (PC) 101, a Digital Front End (DFE) 102, the image forming apparatus 103, and a management server 104. These devices are communicably interconnected to each other via the Internet or the like.

The client PC 101 creates a print job that the user wishes to print and transmits the print job to the DFE 102 or the management server 104. The client PC 101 is equipped with a display unit, which is a liquid crystal display, and input devices such as a mouse and keyboard.

The DFE 102 receives the print job from the client PC 101 or the management server 104, creates rendering data by the Raster Image Processor (RIP) engine based on the received print job, and transmits the rendering data to the image forming apparatus 103. Here, the DFE 102 is an example of an image processing apparatus.

The image forming apparatus 103 forms an image on a recording medium based on the rendering data received from the DFE 102.

The management server 104 manages a print job received from the client PC 101. In response to a request from the DFE 102, the management server 104 transmits the print job to the DFE 102.

The image forming system 100 may be communicably connected to a plurality of image forming apparatuses or a plurality of client PCs.

Example of Hardware Configuration of the DFE 102

Figure 2:
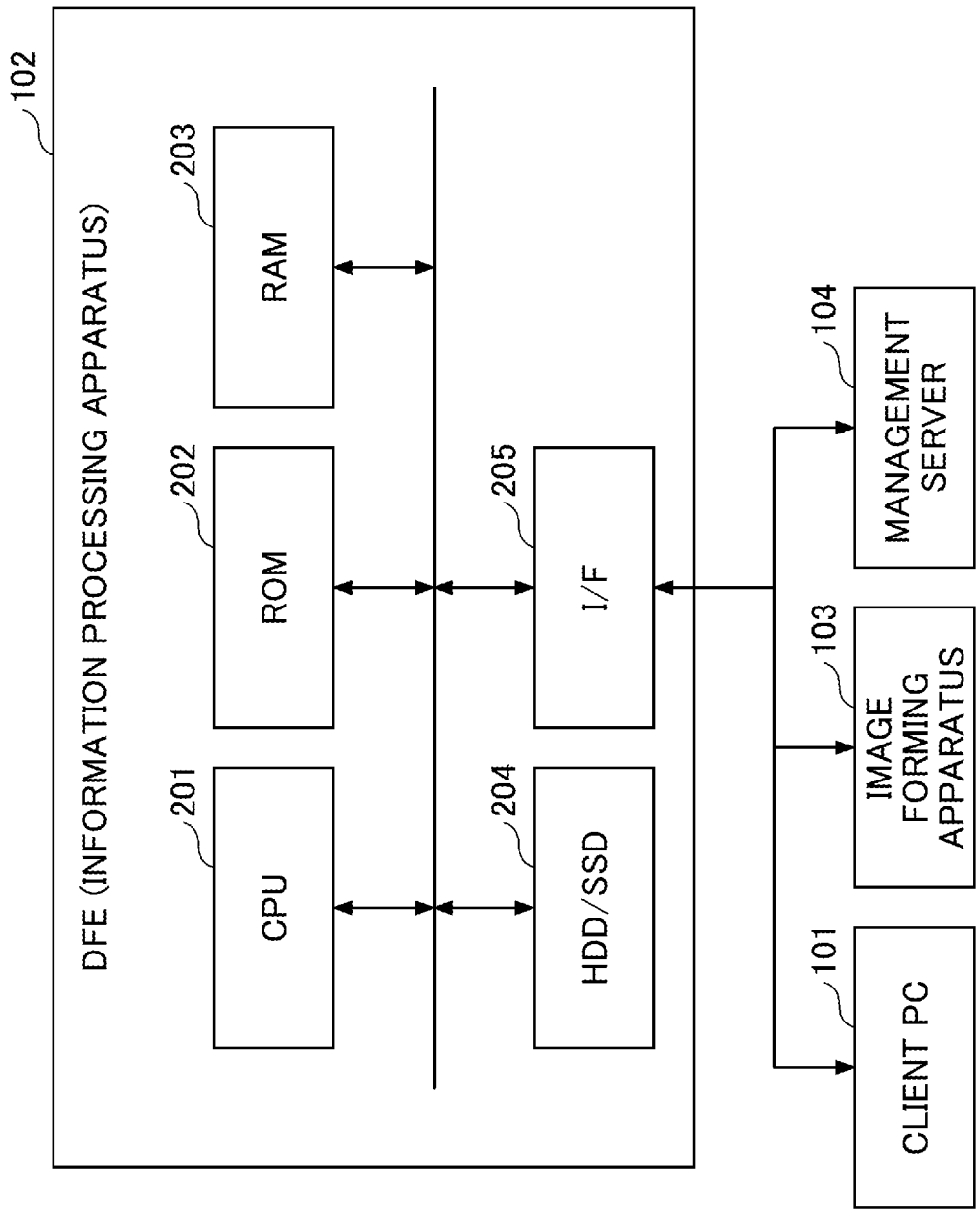
FIG. 2 is a block diagram of an example of a hardware configuration of an embodiment of a Digital Front End (DFE) according to the first embodiment of the present invention.

Referring now to FIG. 2, a hardware configuration of the DFE 102 will be described. FIG. 2 is a block diagram illustrating an example of a hardware configuration of the DFE 102.

As illustrated in FIG. 2, the DFE 102 includes a Central Processing Unit (CPU) 201, a Read Only Memory (ROM) 202, a Random Access Memory (RAM) 203, a Hard Disk (HDD)/Solid State Drive (SSD) 204, and an Interface (I/F) 205.

Among these, the CPU 201 controls the operation of the entire DFE 102 by using the RAM 203 as a work area and executing a program stored in the ROM 202.

The HDD/SSD 204 is used as a storage unit and stores a preset setting value. The information stored in the HDD/SSD 204 may be read and used by the CPU 201 when executing a program.

The I/F 205 is an interface that enables communication between the DFE 102 and the client PC 101, the image forming apparatus 103, and the management server 104.

Example of Hardware Configuration of the Image Forming Apparatus 103

Figure 3:
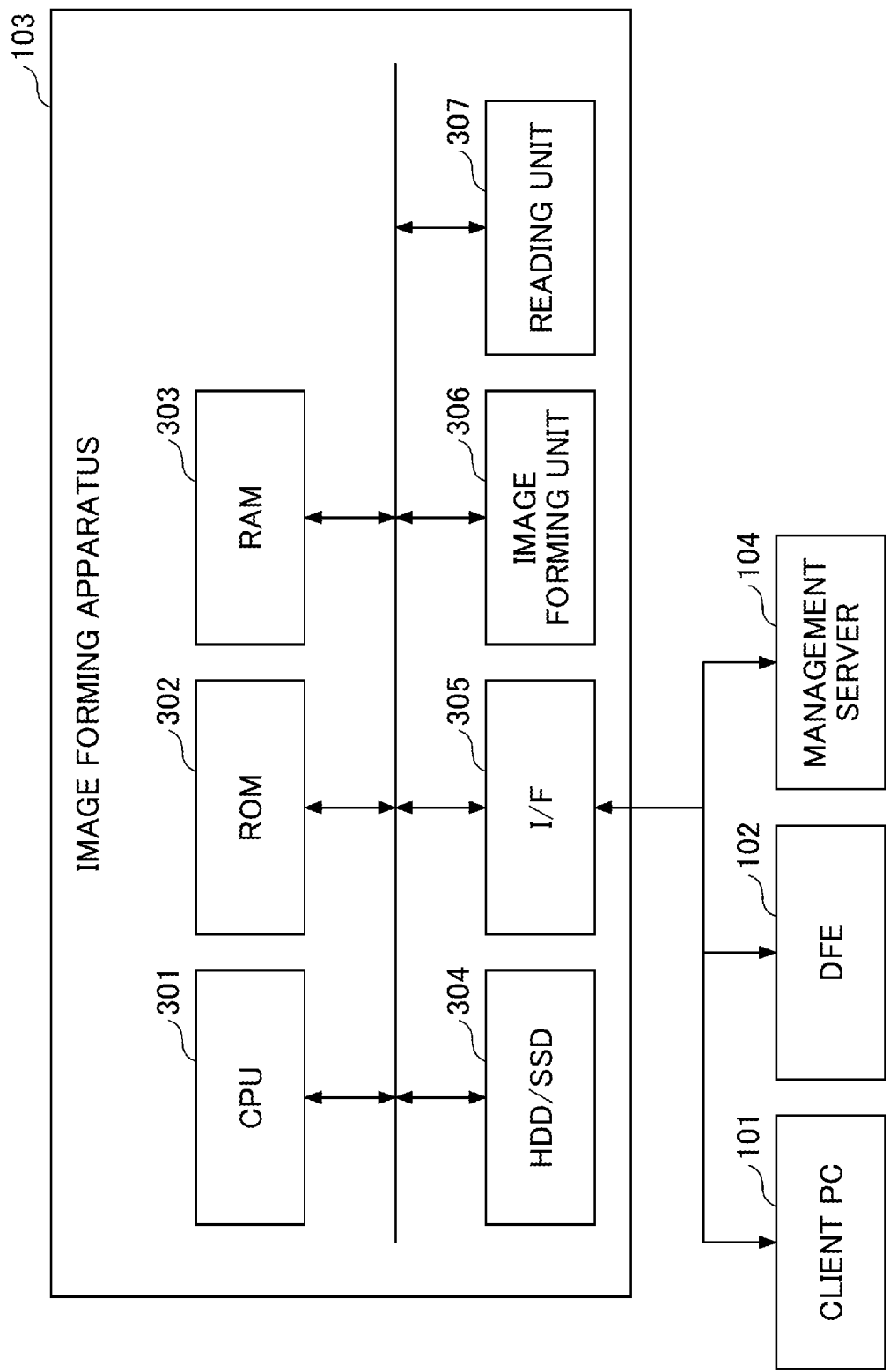
FIG. 3 is a block diagram illustrating an example of a hardware configuration of an image forming apparatus according to the first embodiment of the present invention.

Next, the hardware configuration of the image forming apparatus 103 will be described with reference to FIG. 3. FIG. 3 is a block diagram illustrating an example of a hardware configuration of the image forming apparatus 103.

As illustrated in FIG. 3, the image forming apparatus 103 includes a CPU 301, a ROM 302, a RAM 303, an HDD/SSD 304, an I/F 305, an image forming unit 306, and a reading unit 307.

Among these, the CPU 301 controls the operation of the entire image forming apparatus 103 by using the RAM 303 as the work area and executing a program stored in the ROM 302.

The HDD/SSD 304 is used as a storage unit and stores a preset setting value. The information stored in the HDD/SSD 304 may be read and used by the CPU 301 when executing a program.

The I/F 305 is an interface that enables communication between the image forming apparatus 103 and the DFE 102, the client PC 101, and the management server 104.

The image forming unit 306 is a printing engine that forms an image on a print sheet. The reading unit 307 is a reading device for reading an image formed on a print sheet.

Configuration Example of the Image Forming Apparatus 103

Figure 4:
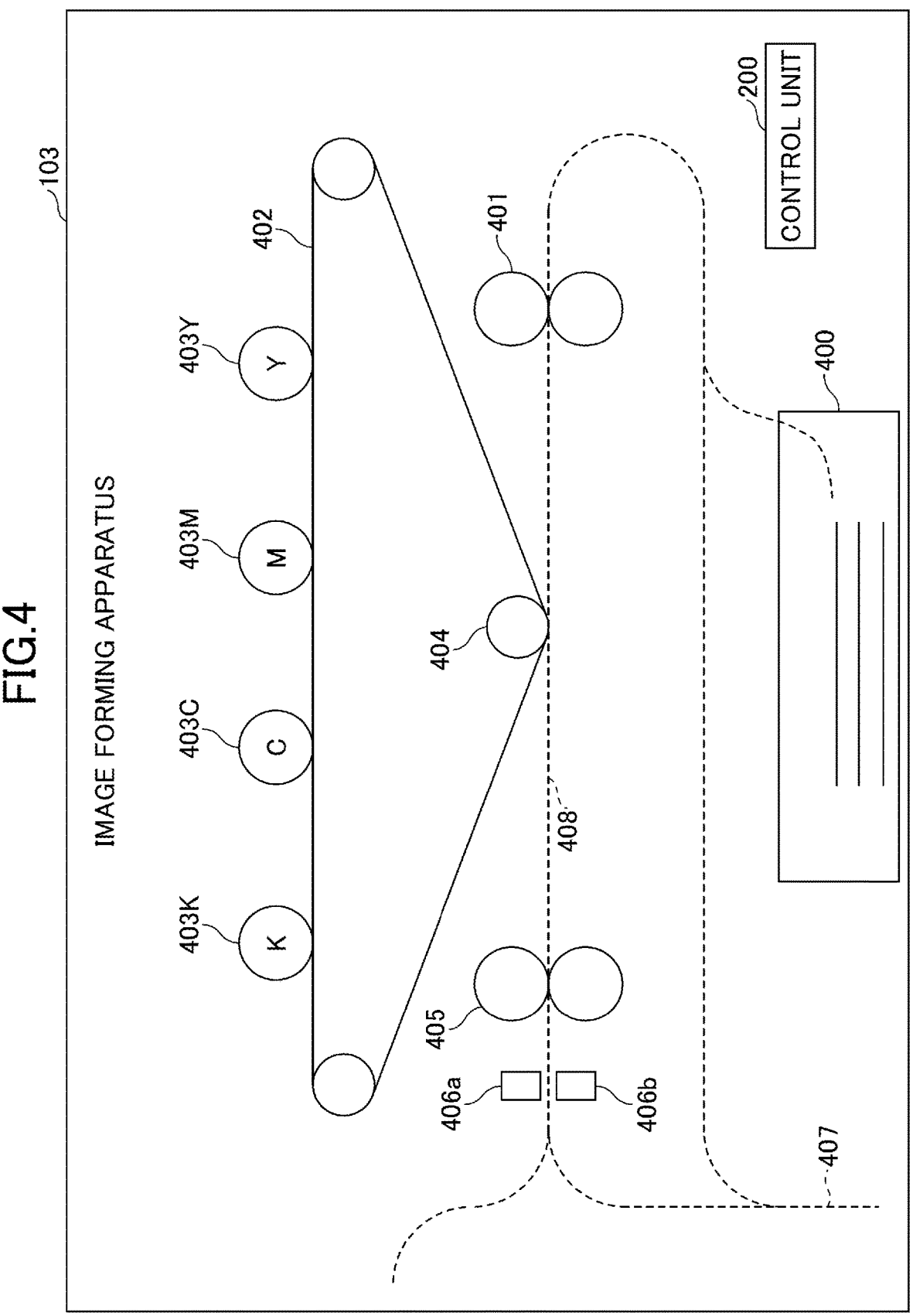
FIG. 4 is a diagram illustrating an example of a configuration of the image forming apparatus according to the first embodiment of the present invention.

Next, a configuration of the image forming apparatus 103 will be described with reference to FIG. 4. FIG. 4 is a diagram illustrating an example of the configuration of the image forming apparatus 103. As illustrated in FIG. 4, the image forming apparatus 103 includes tandem type electrophotographic photoconductor drums 403K, 403C, 403M, and 403Y, an intermediate transfer belt 402, a secondary transfer roller 404, a sheet feeding unit 400, a pair of conveying rollers 401, a fixing roller 405, in-line sensors 406a and 406b, a reverse path 407, and a conveying path 408. Further, the image forming apparatus 103 includes a control unit 200.

The image forming unit 306 of FIG. 3 includes the photoconductor drums 403K, 403C, 403M, and 403Y, the intermediate transfer belt 402, the secondary transfer roller 404, and the fixing roller 405. Further, the reading unit 307 of FIG. 3 includes the in-line sensors 406a and 406b.

The image forming apparatus 103 is what is referred to as a tandem-type image forming apparatus having a configuration in which the photoconductor drums 403Y, 403M, 403C, and 403K (hereinafter, generally referred to as the photoconductor drum 403) of the respective colors are arranged along the intermediate transfer belt 402 that is an endless moving means. The photoconductor drums 403Y, 403M, 403C, and 403K are arranged in an order starting from the upstream side of the intermediate transfer belt 402 in the conveying direction, along the intermediate transfer belt 402 on which an intermediate transfer image is to be formed. The intermediate transfer image is to be transferred onto a print sheet fed from the sheet feeding unit 400 and conveyed by the pair of conveying rollers 401.

The image forming apparatus 103 forms a full color image by transferring and superimposing, onto the intermediate transfer belt 402, the images of the respective colors developed by toner on the surfaces of the photoconductor drums 403 of the respective colors.

The image forming apparatus 103 transfers, by the function of the secondary transfer roller 404, the full color image formed on the intermediate transfer belt 402, onto the paper surface of the print sheet that has been conveyed on the conveying path 408, at a position closest to the conveying path 408 of the print sheet illustrated with a broken line in FIG. 1.

The image forming apparatus 103 further conveys the print sheet on which an image is formed and fixes the image (image formation) by the fixing roller 405. The fixing roller 405 fixes the full color toner image onto the print sheet by heating and pressing the print sheet on which the full color toner image is transferred. The fixing roller 405 generates heat by a heater, such as a halogen heater built into the fixing roller 405, so that the print sheet can be heated.

When double-sided printing is performed, the image forming apparatus 103 performs image formation on the front side of the print sheet, then conveys the print sheet to the reverse path 407 in the conveying path 408, reverses the front side and the back side, and then conveys the print sheet to the position of the secondary transfer roller 404 again.

In the sheet feeding unit 400, a plurality of print sheets are accommodated by being stacked on one another. The sheet feeding unit 400 sequentially picks up the print sheets, which are stacked and accommodated, from the topmost sheet, by a pick-up roller and feeds the print sheet to the pair of the conveying rollers 401 using a pair of sheet feeding rollers.

In the image forming apparatus 103, the in-line sensors 406a and 406b are disposed at the downstream side of the fixing roller 405 in the conveying direction of the print sheet. These in-line sensors 406a and 406b read both sides of the print sheet and obtain the read image data of the image fixed to the print sheet. Note that there may not necessarily be two in-line sensors (the in-line sensors 406a, 406b), and a single in-line sensor (the in-line sensor 406a) may be used. When there is only one in-line sensor (the in-line sensor 406a), the image forming apparatus 103 reads the image by the in-line sensor 406a at the time when the image is formed on the front side, and then performs image formation on the back side.

Example of Functional Configuration of the Control Unit 200

Figure 5:
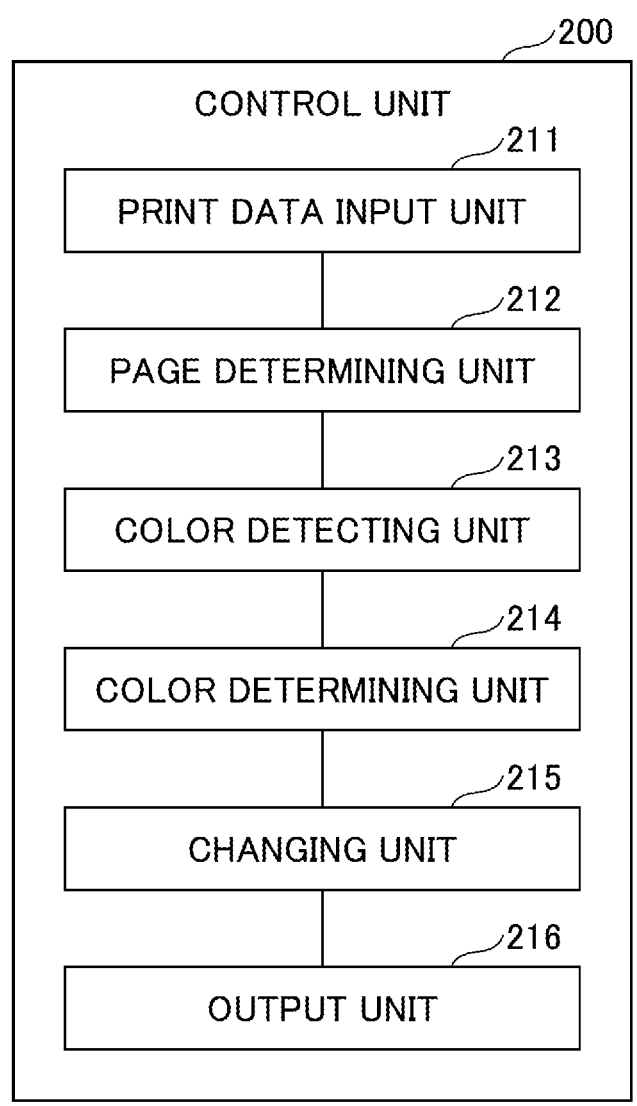
FIG. 5 is a block diagram illustrating a functional configuration of a control unit according to the first embodiment of the present invention.

Next, the functional configuration of the control unit 200 provided in the image forming apparatus 103 will be described with reference to FIG. 5. FIG. 5 is a block diagram illustrating an example of a functional configuration of the control unit 200. As illustrated in FIG. 5, the control unit 200 includes a print data input unit 211, a page determining unit 212, a color detecting unit 213, a color determining unit 214, a changing unit 215, and an output unit 216.

Each of these functions is implemented by, for example, the CPU 301 of FIG. 3 executing a predetermined program. Only the main elements are illustrated in FIG. 5. As such, the control unit 200 may include other elements.

The control unit 200 inputs print data from the DFE 102 through the print data input unit 211. The page determining unit 212 determines whether the input print data includes a plurality of pages. When a plurality of pages are included, the color detecting unit 213 detects the color of the first edge portion region of the first page of the plurality of pages and detects the color of the second edge portion region adjacent to the first edge portion region, in the second page adjacent to the first page.

The color determining unit 214 compares the detected color of the first edge portion region with the detected color of the detected second edge portion region, and determines whether a predetermined condition is satisfied. When it is determined that the predetermined condition is not satisfied, the changing unit 215 changes at least one of the position or the angle of the second page in the print data so as to satisfy the predetermined condition. The output unit 216 can output the changed print data to the outside of the control unit 200.

The control unit 200 changes at least one of the position or the angle of the second page adjacent to the first page in print data such that adjacent edge portion regions satisfy the predetermined condition in all pages of the plurality of pages, while changing the first page. The image forming apparatus 103 forms images of a plurality of pages on the print sheet based on the changed print data. Hereinafter, details of each functional unit of the control unit 200 will be described.

Example Image Including Multiple Pages

Figure 6A:
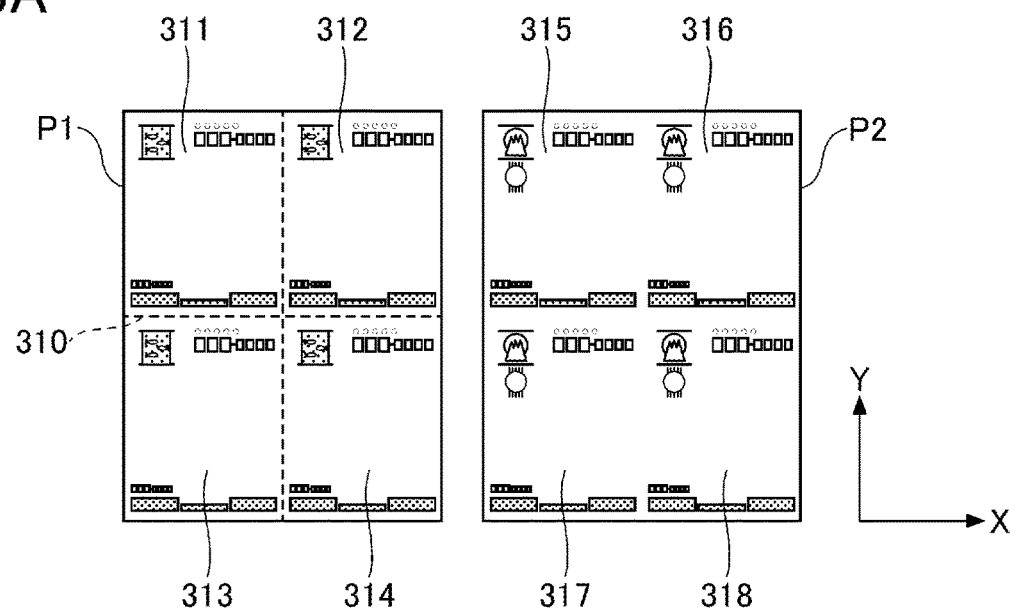
Figure 6B:
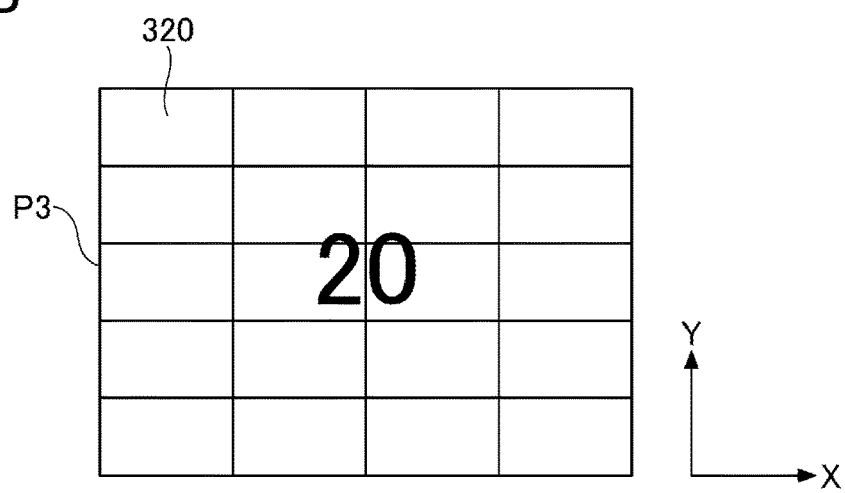
Figure 6C:
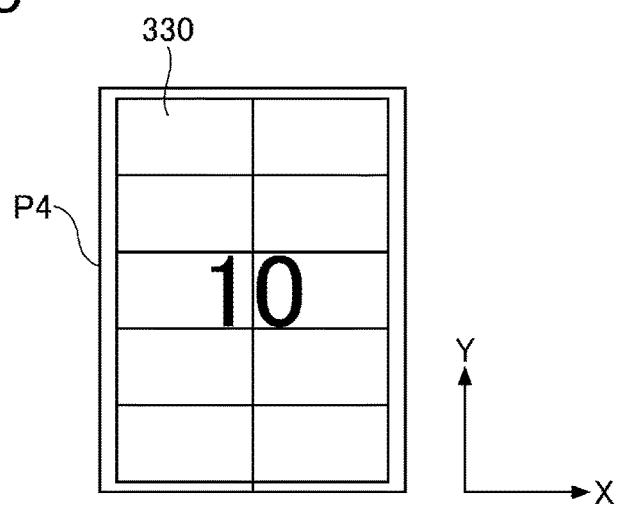

First, an image including a plurality of pages will be described with reference to FIGS. 6A to 6C. FIGS. 6A to 6C are diagrams illustrating various examples of images of a plurality of pages. FIG. 6A illustrates an example of 4 panes of postcards continuously printed, FIG. 6B illustrates an example of 20 panes of labels, and FIG. 6C illustrates an example of 10 panes of business-card-sized cards. A "pane", as in 4 panes, 20 panes, and 10 panes, is synonymous with a "page", so these expressions can also be worded as 4 pages, 20 pages, and 10 pages.

In the following figures, when a print sheet including a plurality of pages or print data including a plurality of pages is illustrated, the positive side of an X-axis illustrated with an arrow in FIG. 6A is expressed as the right side, and the negative side of the X-axis is expressed as the left side. The positive side of a Y-axis in FIG. 6A is expressed as the upper side, and the negative side of the Y-axis is expressed as the lower side.

A print sheet P1 illustrated in FIG. 6A includes images of four panes of postcards 311 to 314. The postcards 311 to 314 are examples of images of a plurality of pages including a first page and a second page adjacent to the first page. The postcard 311 is an example of the first page, and the postcard 312 or the postcard 313 adjacent to the postcard 311 is an example of the second page.

However, the image forming apparatus 103 may select any of the postcards 311 to 314 as the first page. The second page will be different from the selected first page. For example, if the postcard 311 is selected as the first page, the postcard 314 does not become the second page because the postcard 314 is not adjacent to the postcard 311. However, if the postcard 312 is selected as the first page, the postcard 314 may be the second page because the postcard 314 is adjacent to the postcard 312.

The print sheet P1 is cut up into each of the pages after the images of the postcards 311 to 314 are formed, and each cut page is used as a postcard. Cut lines 310 illustrated as dashed lines in the print sheet P1 in FIG. 6A indicate the portions to be cut of the print sheet P1.

Further, the print sheet P1 has no margin between adjacent pages, and one print sheet P1 includes images of a plurality of pages. A margin is a region on a recording medium that is set outside the range of image formation. The margin is cut after image formation and discarded, and is sometimes referred to as "trimming off". For example, the postcard 311 and the postcard 312 are adjacent pages, and there is no margin between the postcard 311 and the postcard 312. The postcard 311 and the postcard 312 are cut at a boundary that is a cut line 310 without any margin.

Similarly, a print sheet P2 illustrated in FIG. 6A includes images including four panes of new year's postcards 315 to 318. The new year's postcards 315 to 318 are examples of a plurality of pages; the new year's postcard 315 is an example of a first page; the new year's postcard 316 or the new year's postcard 317 adjacent to new year's postcard 315 is an example of a second page. The print sheet P2 is cut up into each of the pages after images of the new year's postcards 315 to 318 are formed, and each cut page is used as a new year's postcard. The print sheet P2 includes no margins between adjacent pages, and one print sheet P2 includes images of a plurality of pages.

A print sheet P3 illustrated in FIG. 6B includes label images 320 of 20 panes, on what is referred to as an A4-sized print sheet that has a horizontal size of 297 [mm] and a vertical size of 210 [mm]. However, in FIG. 6B, detailed illustrations of the contents of the label images 320 are omitted. The print sheet P3 is cut up into each of the pages after the label images 320 are formed, and each cut page is used as a label. The label images 320 of 20 panes is an example of a plurality of pages. The print sheet P3 also includes no margins between adjacent pages, and one print sheet P3 includes images of a plurality of pages.

A print sheet P4 illustrated in FIG. 6C includes card images 330 of 10 panes that are business-card-sized, on what is referred to as an A4-sized print sheet that has a horizontal size of 210 [mm] and a vertical size of 297 [mm]. However, in FIG. 6C, detailed illustrations of the contents of the card images 330 are omitted. The print sheet P4 is cut up into each of the pages after the card images 330 are formed, and each cut page is used as a card. The card images 330 of 10 panes are an example of a plurality of pages. The print sheet P4 includes no margins between adjacent pages, and one print sheet P3 includes images of a plurality of pages.

In FIGS. 6A to 6C, examples are illustrated in which the print sheet P1 includes four panes, the print sheet P2 includes 20 panes, and the print sheet P3 includes 10 panes. However, the print sheet is not limited thereto, and the print sheet may include any number of pages.

Further, a rectangle is illustrated as an example of the outer shape of each page. However, the outer shape of each page is not limited thereto, and may be a triangle or a square, as long as it is possible to cut between adjacent pages without a margin.

The images of the plurality of pages included on the print sheet may be the same images or different images.

Example of Arrangement of Images of Multiple Pages

Figure 9B:
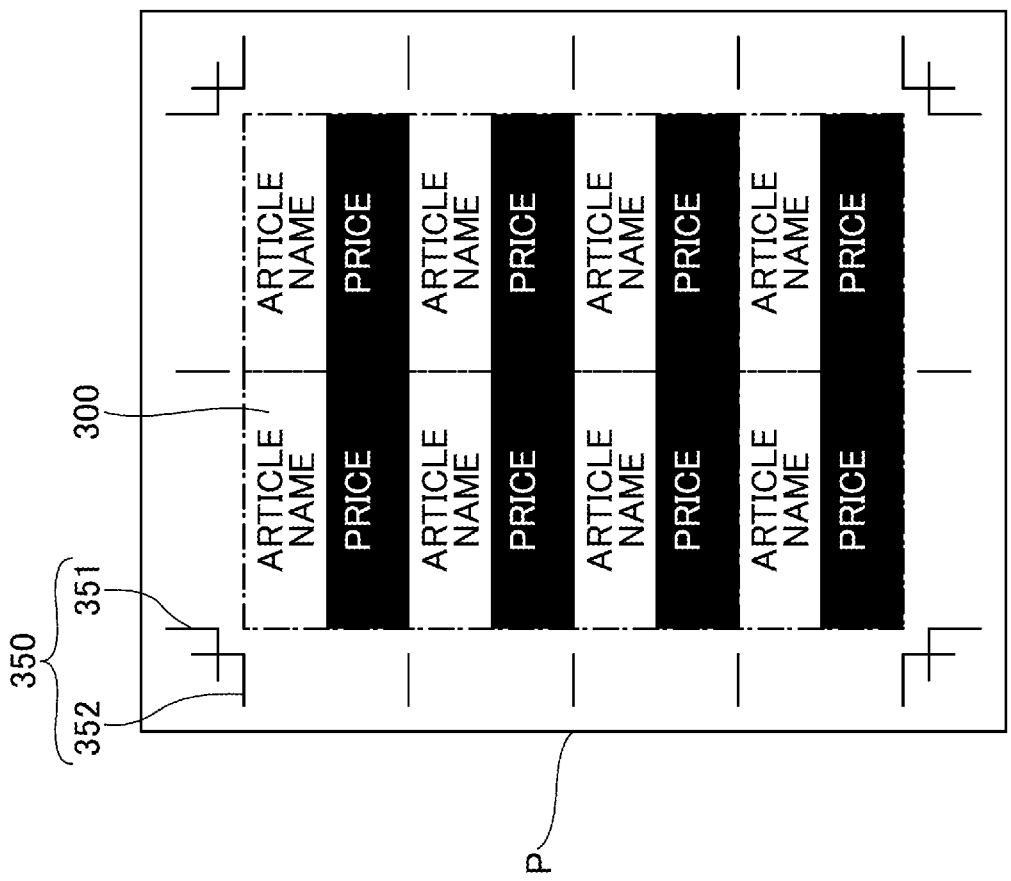

Referring now to FIGS. 7A to 9B, an arrangement of images of a plurality of pages will be described. FIGS. 7A and 7B illustrate a first example, FIGS. 8A and 8B illustrate a second example, and FIGS. 9A and 9B illustrate a third example. FIGS. 7A, 8A, and 9A illustrate print data D, and FIGS. 7B, 8B, and 9B illustrate an arrangement of multiple pages on a print sheet P.

As illustrated in FIG. 7A, the print data D includes page data 500 of 8 panes. The page data 500 is the print data of the page image. The page data 500 includes a white surface region 501 including a character string "article name" on a white surface, and a black surface region 502 including a character string "price" "price" on a black surface. In FIG. 7A, the edge portions of each page data 500 are illustrated by dashed-dotted lines.

The print data D has no margin between adjacent pieces of the page data 500 and does not have any trim marks (crop marks) on the outer periphery of the 8 panes of the page data 500. The trim mark is a mark used to indicate the position for cutting the print sheet into each page of a predetermined size.

FIG. 7B illustrates page images 300 of 8 panes formed on the print sheet P based on the print data D. In FIG. 7B, detailed illustrations of the contents of the images in the page images 300 are omitted. In FIG. 7B, the edge portions of each page image 300 are illustrated as cut lines 310.

Each page image 300 is cut at the cut line 310 as a boundary. A margin region 340 is provided at the outer peripheral portion of the page images 300 of the eight panes on the print sheet P. The margin region 340 is discarded after the page images 300 are cut.

Next, although the print data D illustrated in FIG. 8A does not have a margin between the adjacent pieces of the page data 500, trim marks 510 are provided at the outer periphery of the 8 panes of the page data 500. The trim mark 510 includes a left-right trim mark 511 indicating a cutting position in the left-right (horizontal) direction and an up-down trim mark 512 indicating a cutting position in the up-down (vertical) direction.

FIG. 8B illustrates the page images 300 of 8 panes that are cut with reference to the trim marks 510 after being formed on the print sheet P based on the print data D.

Figure 9A:
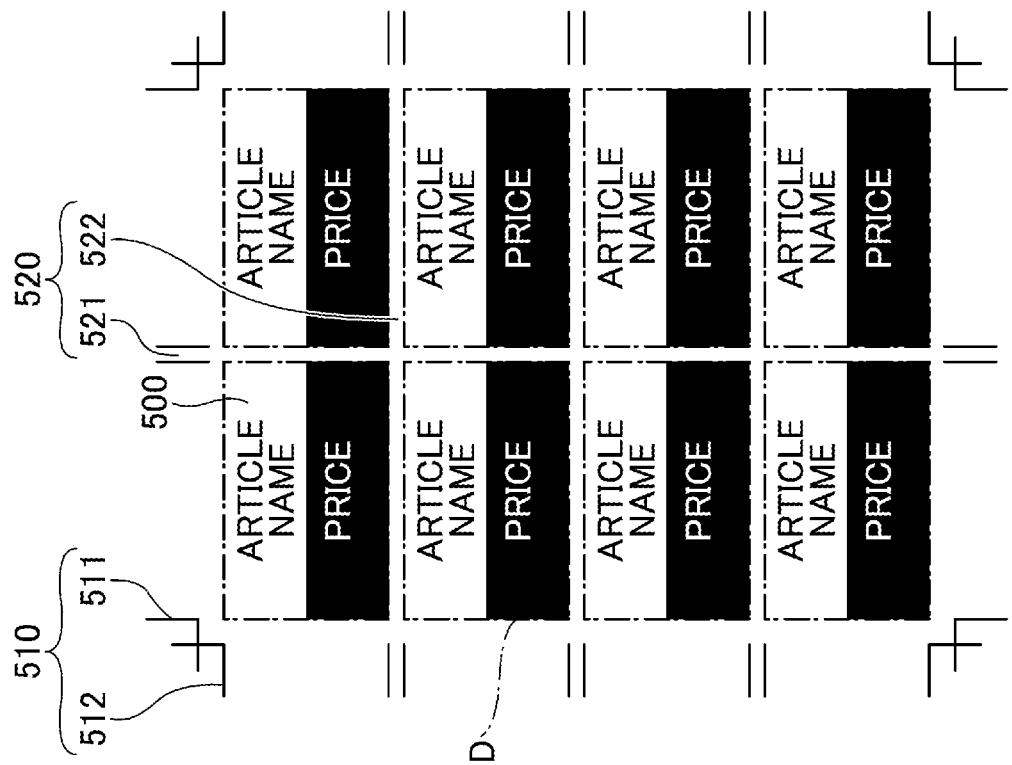

Next, the print data D illustrated in FIG. 9A has a margin 520 between the adjacent pieces of the page data 500 and the trim mark 510 on the outer periphery of the page data 500 of 8 panes. The margin 520 includes a left-right margin 521 and an up-down margin 522.

In an embodiment, the margin 520 in the print data D is deleted at the time of image formation, and the print data D is converted into print data without the margin 520, and then an image of the print data is formed on the print sheet P. FIG. 9B illustrates the print sheet P on which the page images 300 of 8 panes are formed based on the print data after conversion to a state with no margin 520. The print sheet P of FIG. 9B includes a trim mark image 350, but does not include a margin between the adjacent page images 300. The trim mark image 350 includes a left-right trim mark image 351 indicating a cutting position in the left-right (horizontal) direction and an up-down trim mark image 352 indicating a cutting position in the up-down (vertical) direction.

For example, a user of the image forming system 100 may use exclusive-use application software operating on the client PC 101 or the DFE 102 or the like to generate the print data D including examples of a plurality of pages illustrated in FIGS. 7A to 9B. The image forming apparatus 103 can form images of a plurality of pages on the print sheet P based on the print data D input through the print data input unit 211 (see FIG. 5).

Example of Color Determination Method

Figure 10C:
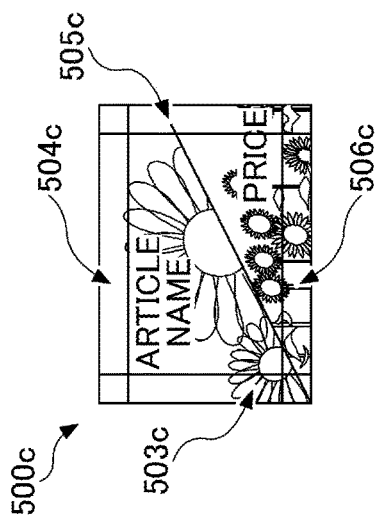
Figure 10B:
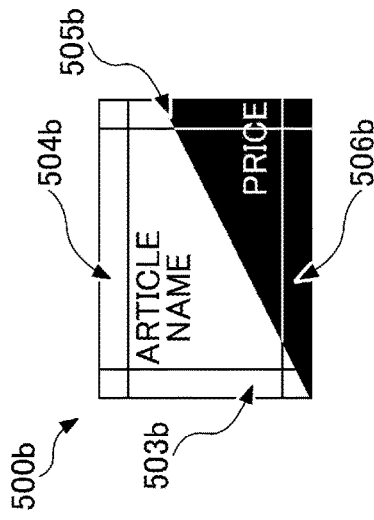
Figure 10A:
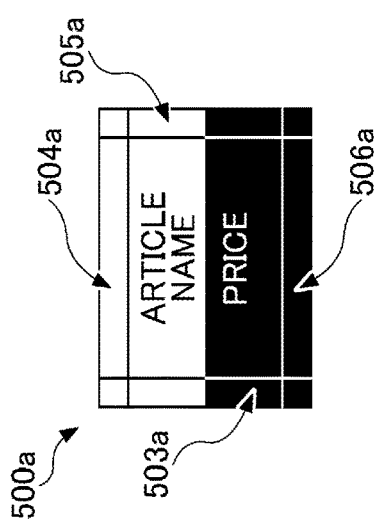
Figure 10D:
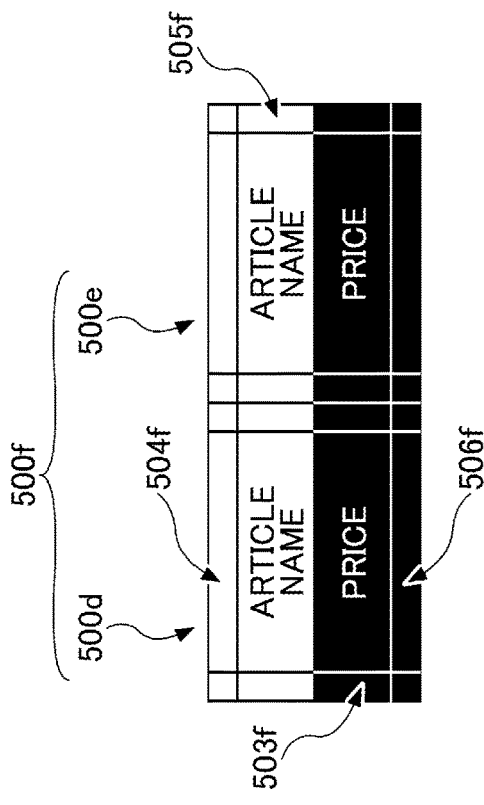

Referring now to FIGS. 10A to 10D, a method of determining whether a color in the edge portion region of each page satisfies a predetermined condition, will be described. FIGS. 10A to 10D are diagrams illustrating examples of a method of determining a color of an edge portion region. FIG. 10A illustrates the first example, FIG. 10B illustrates the second example, FIG. 10C illustrates the third example, and FIG. 10D illustrates the fourth example. The functional configuration diagram of FIG. 5 will also be referred to in the description as appropriate.

As illustrated in FIG. 10A, page data 500a included in the print data includes a left edge portion region 503a, an upper edge portion region 504a, a right edge portion region 505a, and a lower edge portion region 506a.

The left edge portion region 503a is a strip-shaped region of the page data 500a that extends from the top to the bottom and that has a predetermined width from the left end toward the inner side of the page data 500a. Similarly, the upper edge portion region 504a is a strip-shaped region of the page data 500a that extends from the left end to the right end and that has a predetermined width from the top end toward the inner side of the page data 500a. The right edge portion region 505a is a strip-shaped region of the page data 500a that extends from the top end to the bottom end and that has a predetermined width from the right end toward the inner side of the page data 500a. The lower edge portion region 506a is a strip-shaped region of the page data 500a that extends from the left end to the right end and that has a predetermined width from the lower end toward the inner side of the page data 500a. The predetermined width is a width defined in advance, e.g., 3 mm, so that when there is a positional deviation in the image formation with respect to the print sheet or a positional deviation when cutting the sheet and the like, this deviation is included within the predetermined width.

When the page data 500a is set as the first page and it is determined whether the predetermined condition is satisfied between the page data 500a and the second page on the left side of the page data 500a, the color detecting unit 213 detects the color of the left edge portion region 503a of the page data 500a and the color of the right edge portion region of the second page. Here, the image on the second page is the same as the page data 500a and the arrangement of the edge portion regions in the second page is the same as that of the page data 500a, and, therefore, overlapping illustrations of the second page will be omitted. Each edge portion region of the second page will be described by using the same reference numeral as the corresponding edge portion region of the page data 500a.

The color determining unit 214 determines whether the colors of both edge portion regions satisfy a predetermined condition. The left edge portion region 503a of the page data 500a corresponds to one example of the first edge portion region, and the right edge portion region 505a of second page corresponds to one example of the second edge portion region.

A predetermined condition is, for example, whether the difference in color density between the two edge portion regions, is less than a predetermined density threshold. In the example of FIG. 10A, the left edge portion region 503a and the right edge portion region 505a have the same pattern and do not differ in color density, and, therefore, the density difference is less than the density threshold and satisfies the predetermined condition. Therefore, the changing unit 215 does not change the position or the angle of the second page in the page data.

When it is determined whether the predetermined condition is satisfied between the page data 500a and the second page above the page data 500a, the color detecting unit 213 detects the color of the upper edge portion region 504a of the page data 500a and the color of the lower edge portion region 506a of the second page. The color determining unit 214 determines whether the color of the upper edge portion region 504a of the page data 500a and the color of the lower edge portion region 506a of the second page satisfy a predetermined condition. In this case, the upper edge portion region 504a of the page data 500a corresponds to an example of the first edge portion region, and the lower edge portion region 506a of the second page corresponds to an example of the second edge portion region.

In the example of FIG. 10A, the color density of the upper edge portion region 504a and the color density of the lower edge portion region 506a are different, and, therefore, the density difference is not less than the density threshold and the predetermined condition is not satisfied. Accordingly, the changing unit 215 changes at least one of the position or the angle of the second page in the page data to satisfy the predetermined condition.

Further, when it is determined whether the predetermined condition is satisfied between the page data 500a and the second page on the right side of the page data 500a, the color detecting unit 213 detects the color of the right edge portion region 505a of the page data 500a and the color of the left edge portion region 503a of the second page. The color determining unit 214 determines whether the color of the right edge portion region 505a of the page data 500a and the color of the left edge portion region 503a of the second page satisfy the predetermined condition. In this case, the right edge portion region 505a of the page data 500a corresponds to an example of the first edge portion region, and the left edge portion region 503a of the second page corresponds to an example of the second edge portion region.

In the example of FIG. 10A, the right edge portion region 505a and the left edge portion region 503a have the same pattern and do not differ in color density, so that the density difference is less than the density threshold and satisfies a predetermined condition. Therefore, the changing unit 215 does not change the position or the angle of the second page in the page data.

Further, when it is determined whether the predetermined condition is satisfied between the page data 500a and the second page below the page data 500a, the color detecting unit 213 detects the color of the lower edge portion region 506a of the page data 500a and the color of the upper edge portion region 504a of the second page. The color determining unit 214 determines whether the color of the lower edge portion region 506a of the page data 500a and the color of the upper edge portion region 504a of the second page satisfy the predetermined condition. In this case, the lower edge portion region 506a of the page data 500a corresponds to an example of the first edge portion region, and the upper edge portion region 504a of the second page corresponds to an example of the second edge portion region.

In the example of FIG. 10A, the color density of the lower edge portion region 506a and the color density of the upper edge portion region 504a are different, and, therefore, the density difference is not less than the density threshold and the predetermined condition is not satisfied. Accordingly, the changing unit 215 changes at least one of the position or the angle of the second page in the page data to satisfy the predetermined condition.

Next, in page data 500b illustrated in FIG. 10B, the boundary between the white region and the black region is oblique. As in the case of FIG. 10A, the image on the second page is the same as the page data 500b and the arrangement of each edge portion region is the same as that of the page data 500b. Therefore, each edge portion region of the second page will be described by using the same reference numeral as the corresponding edge portion region of the page data 500b.

In order to determine whether a predetermined condition is satisfied between the page data 500b and the second page on the left side of the page data 500b, the color detecting unit 213 detects the color of the left edge portion region 503b of the page data 500b and the color of the right edge portion region 505b of the second page. The color determining unit 214 determines whether the color of the left edge portion region 503b of the page data 500b and the color of the right edge portion region 505b of the second page satisfy the predetermined condition.

In the example of FIG. 10B, the left edge portion region 503b and the right edge portion region 505b have different patterns and different color densities, and, therefore, the density difference is not less than the density threshold and the predetermined condition is not satisfied. Accordingly, the changing unit 215 changes at least one of the position or the angle of the second page in the page data to satisfy a predetermined condition.

When it is determined whether the predetermined condition is satisfied between the page data 500b and the second page above the page data 500b, the color detecting unit 213 detects the color of the upper edge portion region 504b of the page data 500b and the color of the lower edge portion region 506b of the second page. The color determining unit 214 determines whether the color of the upper edge portion region 504b of the page data 500b and the color of the lower edge portion region 506b the second page satisfy a predetermined condition.

In the example of FIG. 10B, the color density of the upper edge portion region 504b and the color density of the lower edge portion region 506b are different, and, therefore, the density difference is not less than the density threshold and the predetermined condition is not satisfied. Accordingly, the changing unit 215 changes at least one of the position or the angle of the second page in the page data to satisfy the predetermined condition.

Further, when it is determined whether the predetermined condition is satisfied between the page data 500b and the second page on the right side of the page data 500b, the color detecting unit 213 detects the color of the right edge portion region 505b of the page data 500b and the color of the left edge portion region 503b of the second page. The color determining unit 214 determines whether the color of the right edge portion region 505b of the page data 500b and the color of the left edge portion region 503b of the second page satisfy the predetermined condition.

In the example of FIG. 10B, the right edge portion region 505b and the left edge portion region 503b have different color densities, and, therefore, the density difference is not less than the density threshold and the predetermined condition is not satisfied. Accordingly, the changing unit 215 changes at least one of the position or the angle of the second page in the page data to satisfy the predetermined condition.

Further, when it is determined whether the predetermined condition is satisfied between the page data 500b and the second page below the page data 500b, the color detecting unit 213 detects the color of the lower edge portion region 506b of the page data 500b and the color of the upper edge portion region 504b of the second page. The color determining unit 214 determines whether the color of the lower edge portion region 506b of the page data 500b and the color of the upper edge portion region 504b of the second page satisfy the predetermined condition.

In the example of FIG. 10B, the lower edge portion region 506b and the upper edge portion region 504b differ in color density, and, therefore, the density difference is not less than the density threshold and the predetermined condition is not satisfied. Accordingly, the changing unit 215 changes at least one of the position or the angle of the second page in the page data to satisfy a predetermined condition.

Next, page data 500c illustrated in FIG. 10C is a combination of two photographs with different patterns. Also in the page data 500c, similar to the page data 500a and the page data 500b, it is determined whether the color of the edge portion region of the page data and the color of the edge portion region of the adjacent page data satisfy a predetermined condition. When the density difference between the edge portion regions is less than the density threshold, the changing unit 215 does not change the position or the angle of the second page in the page data. On the other hand, when the density difference is not less than the density threshold, the changing unit 215 changes at least one of the position or the angle of the second page in the page data.

Next, FIG. 10D is an example in which page data 500d and page data 500e of the same pattern are adjacent to each other in a left-right (horizontal) direction. In this case, by using page data 500f, in which the page data 500d and the page data 500e are combined, as the first page, it is determined whether the color of the edge portion region of the page data 500f and the color of the edge portion region of a second page adjacent to the page data 500f satisfies the predetermined condition. In this manner, the color determining process and the changing process can be simplified. FIG. 10D illustrates a case in which pieces of page data having the same pattern are adjacent to each other in the left-right (horizontal) direction; however, the present embodiment is not limited thereto. For example, when pieces of page data having the same pattern are adjacent to each other in the vertical direction, the color determining process and the changing process can be performed by using page data in which pieces of the same page data that are adjacent to each other in the vertical direction are combined. The number of pieces of page data to be combined may be three or more.

In the above cases, the density difference of monochrome images is taken as an example of the predetermined condition, but the condition is not limited thereto. For example, when the print data is in color, it can be determined whether the gradation difference between the respective gradation values of red (R), green (G), and blue (B), or the respective gradation values of yellow (Y), magenta (M), cyan (C), and black (K) of the first edge portion region of the first page, and the respective gradation values of R, G, and B, or the respective gradation values of Y, M, C, and K of the second edge portion region of the second page, is less than a gradation threshold. For each of the pixels configuring the first edge portion region and the second edge portion region, the gradation difference is obtained for each of R, G, and B, or Y, M, C, and K, and when the number of pixels where the gradation difference is greater than or equal to the gradation threshold is greater than or equal to a predetermined number of pixels, it is determined that the predetermined condition is not satisfied. However, the average value of the gradation values of each of R, G, and B, or Y, M, C, and K, in the pixels configuring the first edge portion region and the second edge portion region, may be used.

The changing unit 215 can change at least one of the position or the angle of the page in the print data such that the gradation difference between the print data of the first edge portion region and the print data of the second edge portion region becomes less than a predetermined gradation threshold on a per color basis of R, G, and B, or Y, M, C, and K.

Figure 11:
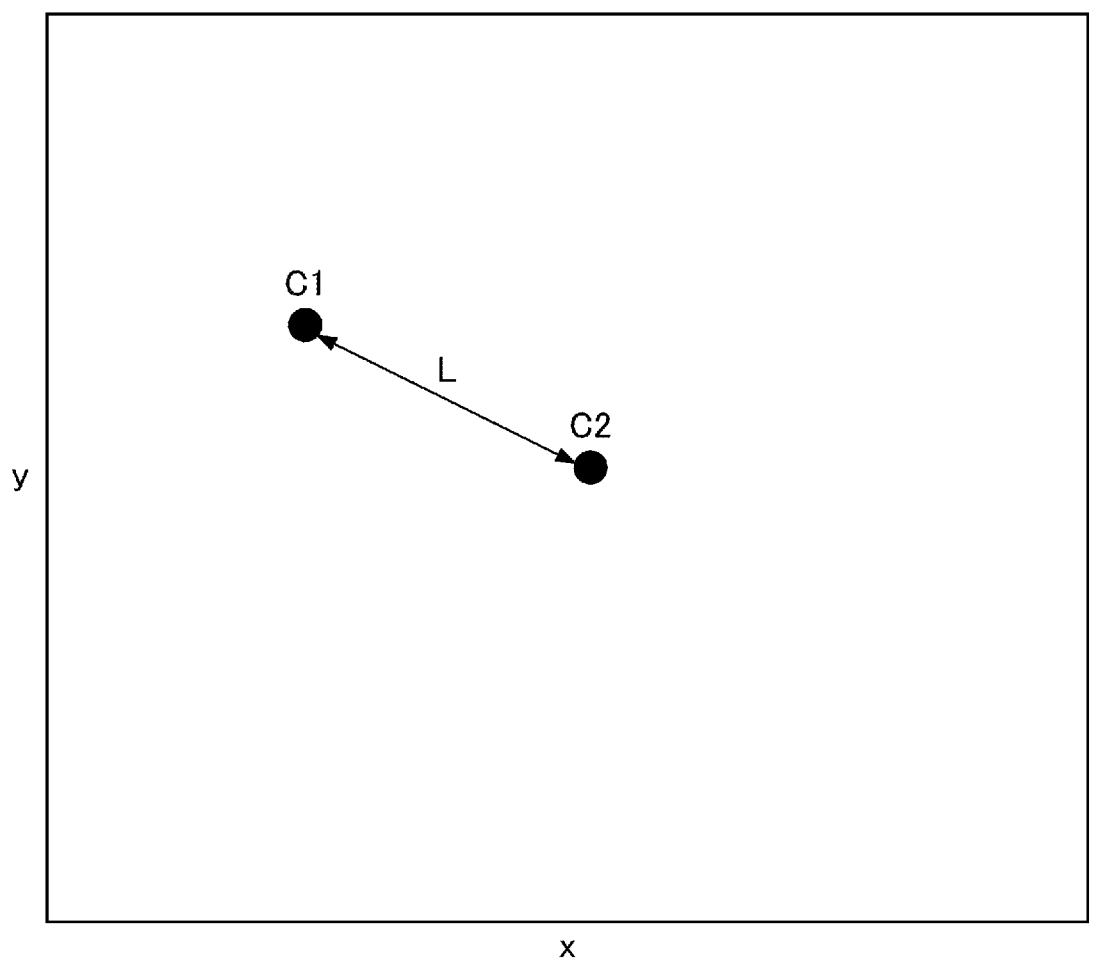
FIG. 11 is a diagram illustrating a distance in a chromaticity diagram according to the first embodiment of the present invention.

It may be determined whether the distance in a chromaticity diagram between the color of the first edge portion region and the color of the second edge portion region is less than a predetermined distance threshold. FIG. 11 is a diagram illustrating an example of a distance in a chromaticity diagram. The chromaticity diagram refers to a diagram representing chromaticity using chromaticity coordinates.

A first color coordinate C1 in FIG. 11 represents the chromaticity of the first edge portion region of the first page, and a second color coordinate C2 represents the chromaticity of the second edge portion region of the second page. When a color-to-color distance L between the first color coordinate C1 and the second color coordinate C2 is less than a predetermined distance threshold, it can be determined that the first edge portion region and the second edge portion region satisfy the predetermined condition. When the color-to-color distance L is obtained for each pixel configuring the first edge portion region and the second edge portion region, and the number of pixels in which the color-to-color distance L is greater than or equal to the distance threshold is greater than or equal to a predetermined number of pixels, it is determined that the predetermined condition is not satisfied. However, the average value of the color-to-color distance L of all pixels configuring the first edge portion region and the second edge portion region may be used. In FIG. 11, an xy chromaticity diagram is illustrated, but a xyz chromaticity diagram may be applied.

The changing unit 215 can change at least one of the position or the angle of the second page in the print data such that the distance in the chromaticity diagram between the color of the first edge portion region and the color of the second edge portion region becomes less than a predetermined distance threshold.

Other than the above-described density difference and color-to-color distance, it may be determined whether the difference in color tone, color difference, hue, or brightness between the first edge portion region and the second edge portion region is less than a predetermined threshold. It is also possible to compare size of the pattern, arrangement of the pattern, the area of the colorless portion of the pattern, or the like of the pattern, between the first edge portion region and the second edge portion region, to determine whether the predetermined condition is satisfied.

Example of Changing Page

Figures 12A, 12B:
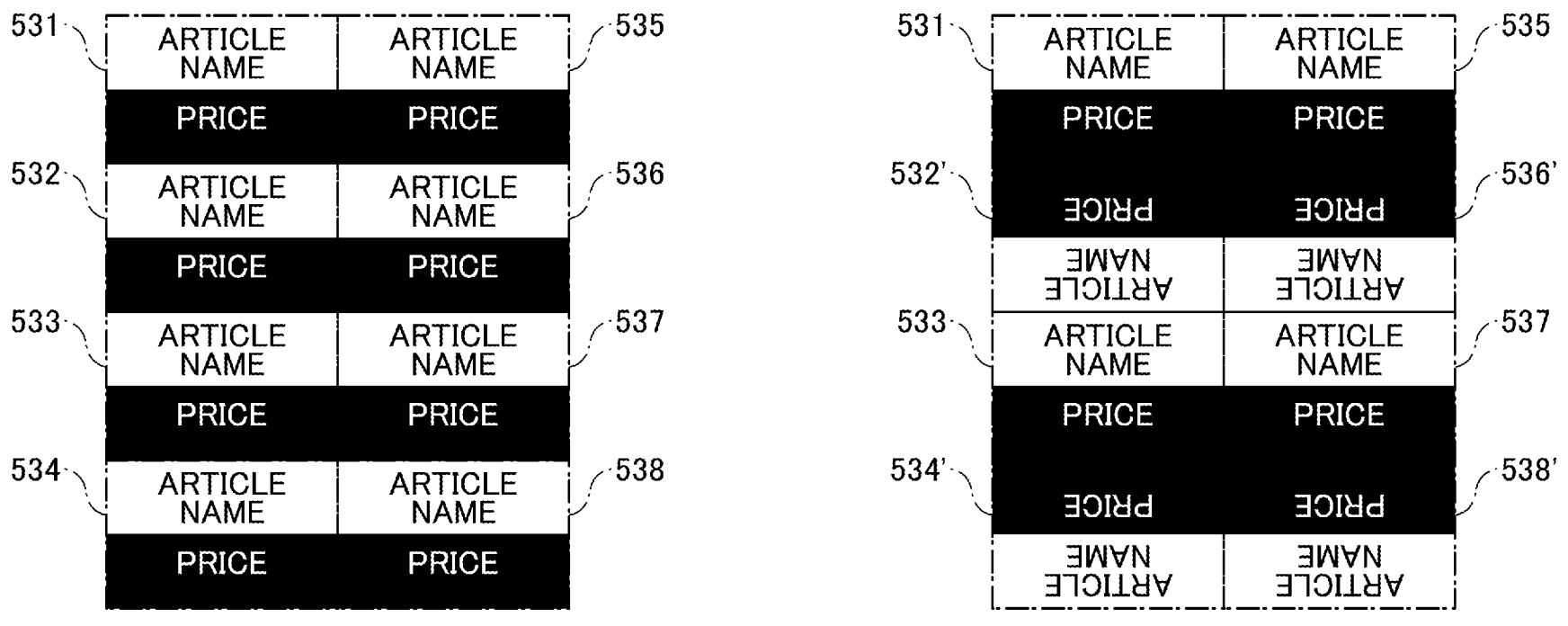
Figure 13B:
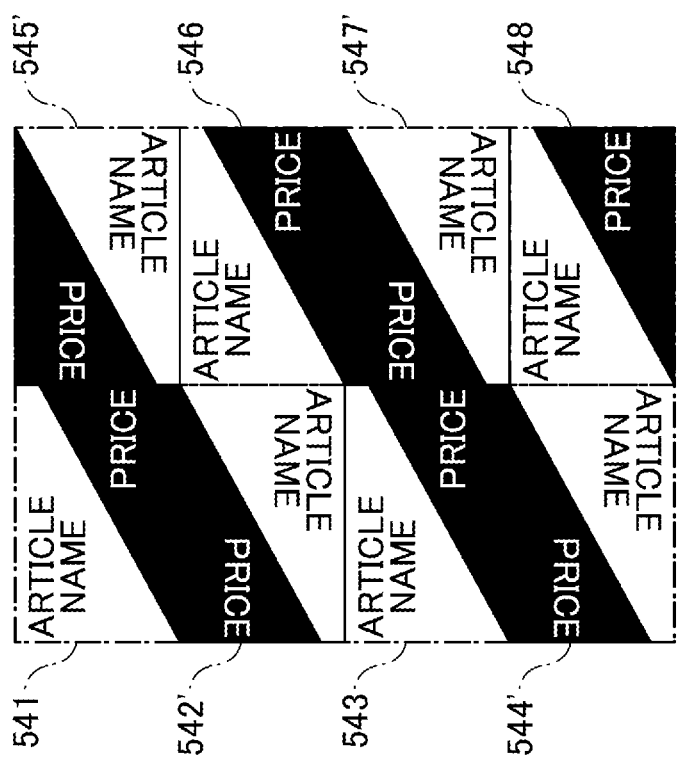
Figure 13A:
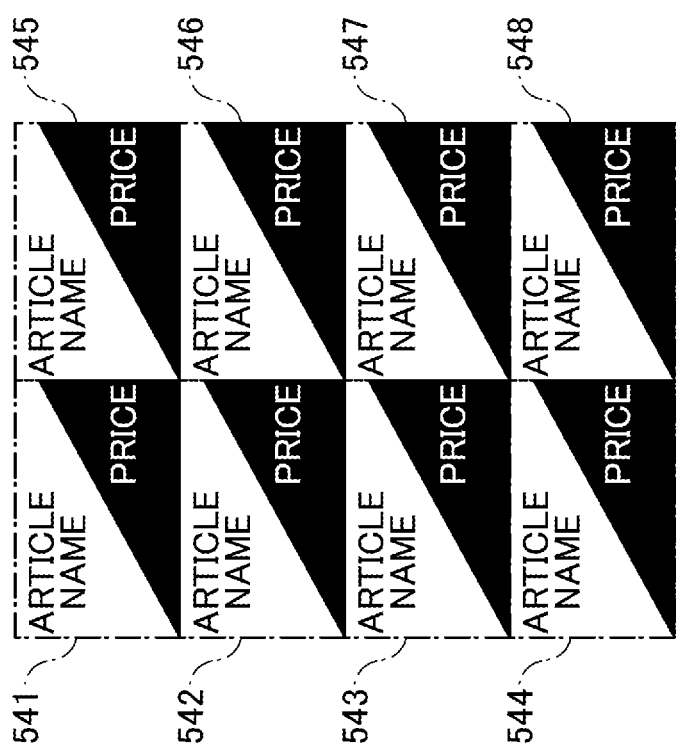

Next, examples of results of changing pages in the print data will be described with reference to FIGS. 12A to 13B. FIGS. 12A and 12B illustrate a first example, and FIGS. 13A and 13B illustrate a second example. FIGS. 12A and 13A illustrate a state before the change and FIGS. 12B and 13B illustrate a state after the change.

In FIG. 12A, the color determining unit 214 (see FIG. 5) determines that the density difference between the lower edge portion region of page data 531 and the upper edge portion region of the page data 532 is not less than the density threshold, with the page data 531 selected as the first page and the page data 532 selected as the second page. The changing unit 215 rotates the page data 532 by 180 degrees in response to the determination result, such that the density difference between the lower edge portion region of the page data 531 and the upper edge portion region of the page data 532 becomes less than the density threshold. Then, as illustrated in FIG. 12B, page data 532' after the 180 degrees rotation is arranged below the page data 531. This causes the density difference between the lower edge portion region of the page data 531 and the upper edge portion region of the page data 532' to be less than the density threshold.

Next, in FIG. 12A, the color determining unit 214 determines that the density difference between the lower edge portion region of page data 535 and the upper edge portion region of page data 536 is not less than the density threshold, with the page data 535 selected as the first page and the page data 536 selected as the second page. The changing unit 215 rotates the page data 536 by 180 degrees in response to the determination result, such that the density difference between the lower edge portion region of the page data 535 and the upper edge portion region of the page data 536 becomes less than the density threshold. Then, as illustrated in FIG. 12B, page data 536' after the 180 degrees rotation is arranged below the page data 535. This causes the density difference between the lower edge portion region of the page data 535 and the upper edge portion region of the page data 536' to be less than the density threshold.

Next, in FIG. 12B, the color determining unit 214 determines that the density difference between the lower edge portion region of the page data 532' and the upper edge portion region of page data 533 is less than the density threshold, with the page data 532' selected as the first page and the page data 533 selected as the second page. In this case, the changing unit 215 does not change the position or the angle of the page data 533.

Next, in FIG. 12B, the color determining unit 214 determines that the density difference between the lower edge portion region of the page data 536' and the upper edge portion region of page data 537 is less than the density threshold, with the page data 536' selected as the first page and the page data 537 selected as the second page. Also in this case, the changing unit 215 does not change the position or the angle of the page data 537.

Next, in FIG. 12A, the color determining unit 214 determines that the density difference between the lower edge portion region of the page data 533 and the upper edge portion region of page data 534 is not less than the density threshold, with the page data 533 selected as the first page and the page data 534 selected as the second page. The changing unit 215 rotates the page data 534 by 180 degrees in response to the determination result, such that the density difference between the lower edge portion region of the page data 533 and the upper edge portion region of the page data 534 becomes less than the density threshold. Then, as illustrated in FIG. 12B, the page data 534' after the 180 degrees rotation is arranged below the page data 533. This causes the density difference between the lower edge portion region of the page data 533 and the upper edge portion region of the page data 534' to be less than the density threshold.

Next, in FIG. 12A, the color determining unit 214 determines that the density difference between the lower edge portion region of page data 537 and the upper edge portion region of page data 538 is not less than the density threshold, with the page data 537 selected as the first page and the page data 538 selected as the second page. The changing unit 215 rotates the page data 538 by 180 degrees in response to the determination result, such that the density difference between the lower edge portion region of the page data 537 and the upper edge portion region of the page data 538 becomes less than the density threshold. Then, as illustrated in FIG. 12B, the page data 538' after the 180 degrees rotation is arranged below the page data 537. This causes the density difference between the lower edge portion region of the page data 537 and the upper edge portion region of the page data 538' to be less than the density threshold.

The image forming apparatus 103 can form an image on the print sheet based on the changed print data illustrated in FIG. 12B.

In FIG. 13A, the color determining unit 214 determines that the density difference between the lower edge portion region of page data 541 and the upper edge portion region of page data 542 is not less than the density threshold, with the page data 541 selected as the first page and the page data 542 selected as the second page. The changing unit 215 rotates the page data 542 by 180 degrees in response to the determination result, such that the density difference between the lower edge portion region of the page data 541 and the upper edge portion region of the page data 542 becomes less than the density threshold. Then, as illustrated in FIG. 13B, page data 542' after the vertical inversion is arranged below the page data 541. This causes the density difference between the lower edge portion region of the page data 541 and the upper edge portion region of the page data 542' to be less than the density threshold.

Next, in FIG. 13A, the color determining unit 214 determines that the density difference between the lower edge portion region of page data 545 and the upper edge portion region of page data 546 is not less than the density threshold, with the page data 545 selected as the first page and the page data 546 selected as the second page. The changing unit 215 rotates the page data 545 by 180 degrees in response to the determination result, such that the density difference between the lower edge portion region of the page data 545 and the upper edge portion region of the page data 546 becomes less than the density threshold. Then, as illustrated in FIG. 13B, page data 545' after the vertical inversion is arranged above page data 546. This causes the density difference between the lower edge portion region of the page data 545' and the upper edge portion region of the page data 546 to be below the density threshold.

Next, in FIG. 13B, the color determining unit 214 determines that the density difference between the lower edge portion region of the page data 542' and the upper edge portion region of page data 543 is less than the density threshold, with the page data 542' selected as the first page and the page data 543 selected as the second page. In this case, the changing unit 215 does not change the position or the angle of the page data 543.

Next, in FIG. 13A, the color determining unit 214 determines that the density difference between the lower edge portion region of the page data 543 and the upper edge portion region of the page data 544 is not less than the density threshold, with the page data 543 selected as the first page and the page data 544 selected as the second page. The changing unit 215 rotates the page data 544 by 180 degrees in response to the determination result, such that the density difference between the lower edge portion region of the page data 543 and the upper edge portion region of the page data 544 becomes less than the density threshold. Then, as illustrated in FIG. 13B, the page data 544' after the vertical inversion is arranged below the page data 543. This causes the density difference between the lower edge portion region of the page data 543 and the upper edge portion region of the page data 544' to be less than the density threshold.

Next, in FIG. 13A, the color determining unit 214 determines that the density difference between the lower edge portion region of the page data 547 and the upper edge portion region of the page data 548 is not less than the density threshold, with the page data 547 selected as the first page and the page data 548 selected as the second page. The changing unit 215 rotates the page data 547 by 180 degrees in response to the determination result, such that the density difference between the lower edge portion region of the page data 547 and the upper edge portion region of the page data 548 becomes less than the density threshold. Then, as illustrated in FIG. 13B, the page data 547' after the vertical inversion is arranged above page data 548. This causes the density difference between the lower edge portion region of the page data 547' and the upper edge portion region of the page data 548 to be less than the density threshold.

Next, in FIG. 13B, the color determining unit 214 determines that the density difference between the lower edge portion region of the page data 546 and the upper edge portion region of page data 547' is less than the density threshold, with the page data 546 selected as the first page and the page data 547' selected as the second page. Also in this case, the changing unit 215 does not change the position or the angle of the page data 547'.

The image forming apparatus 103 can form an image on the print sheet based on the changed print data illustrated in FIG. 13B.

In the examples of FIGS. 12A to 13B, a case in which it is determined whether the predetermined condition is satisfied based on the density difference between the edge portion regions of adjacent page data in the vertical direction is illustrated. However, it is possible to determine whether the predetermined condition is satisfied based on the density difference between the edge portion regions of adjacent page data in the horizontal direction.

Again illustrated is an example of rotating the page data by 180 degrees, but the page data corresponding to the second page may be rotated at an angle other than 180 degrees. For example, if the outer shape of each page is a square, the page data corresponding to the second page may be rotated by 90 degrees, or if the outer shape of each page is a triangle, the page data corresponding to the second page may be rotated by a multiple of 60 degrees.

The page data corresponding to the second page may also be mirror-inverted. Instead of changing the angle, the position of the page data corresponding to the second page can be changed, such as by interchanging the positions of the page data 532 and the page data 538 in FIG. 12A. Both the angle and the position may be changed. Further, in the case of a print sheet where the top and bottom are determined according to the format, as in the case of a postcard, a setting may be made so that only the position can be changed, and the angle cannot be changed.

When the page position and the order of the pages are determined in the data, a setting may be made so that only the angle can be changed, and the position and the order of the pages cannot be changed. In double-sided printing, the pages on the front and back sides are paired data, and, therefore, if at least one of the position or the angle of the page on the front side of the print sheet is changed, the position or the angle of the page on the back side of the print sheet may be changed such that the front and back pages are paired. If the front side is changed such that both sides are aligned in the cut-out printed matter, the back side may be changed as well.

Example of Process by the Control Unit 200

Figure 14:
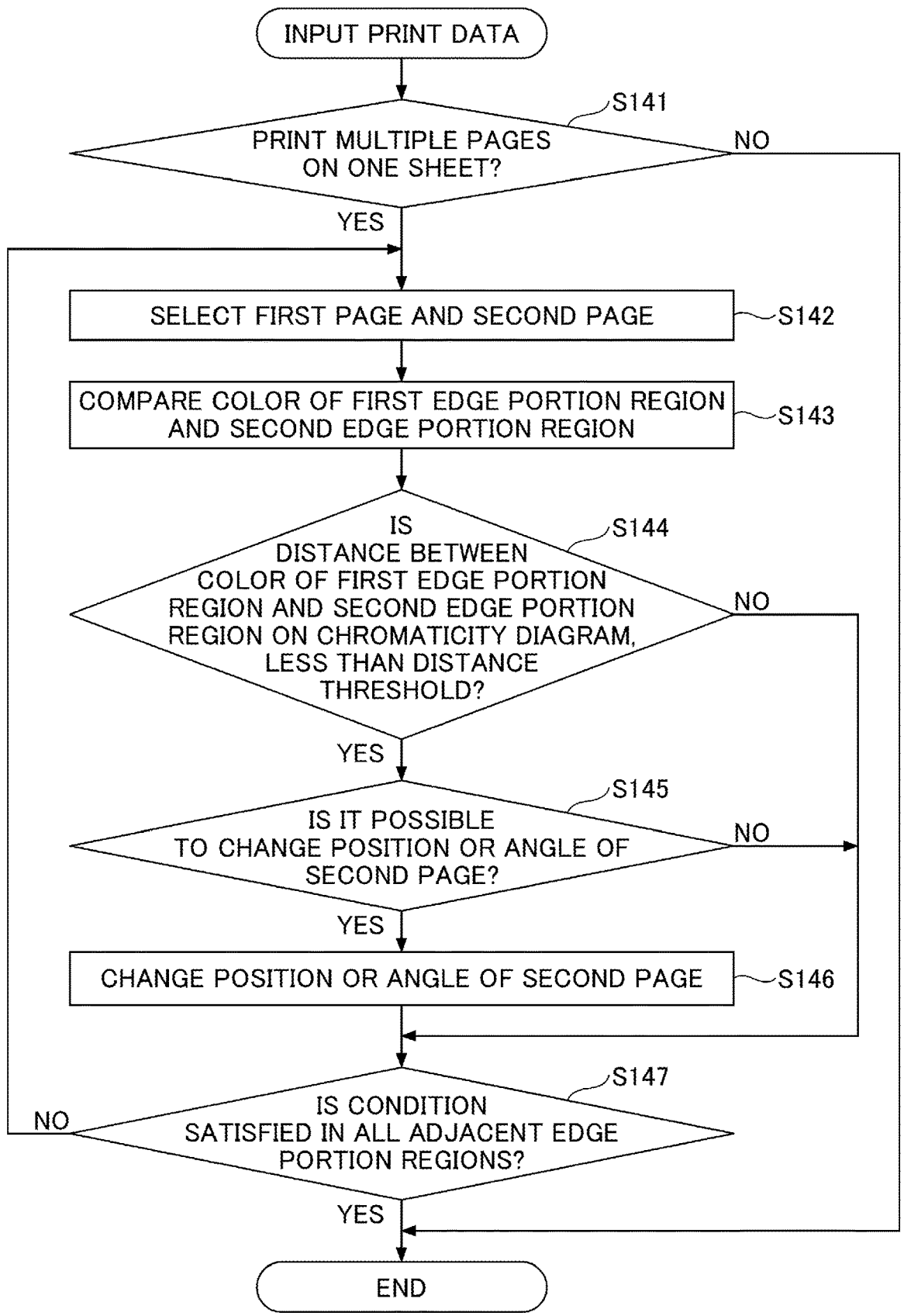
FIG. 14 is a flowchart illustrating an example of a process by the control unit according to the first embodiment of the present invention.

Next, a process by the control unit 200 will be described with reference to FIG. 14. FIG. 14 is a flowchart illustrating an example of a process by the control unit 200. FIG. 14 illustrates a process in which the timing when the control unit 200 inputs the print data from the DFE 102, is set as the starting point. Further, a case where the distance between the color of the first edge portion region and the color of the second edge portion region in a chromaticity diagram is used as a predetermined condition, is illustrated as an example. Hereinafter, the functional configuration illustrated in FIG. 5 or the like will be referred to in the description as appropriate.

When the control unit 200 inputs print data through the print data input unit 211, in step S141, the page determining unit 212 determines whether the input print data includes a plurality of pages.

In step S141, when it is determined that the print data does not include a plurality of pages (NO in step S141), the control unit 200 ends the process. On the other hand, when it is determined that the print data includes a plurality of pages (YES in step S141), in step S142, the color detecting unit 213 selects a first page and a second page adjacent to the first page, out of a plurality of pages. Then, the color of the first edge portion region of the first page is detected, and the color of the second edge portion region adjacent to the first edge portion region on the second page adjacent to the first page is detected.

Subsequently, in step S143, the color determining unit 214 compares the color of the first edge portion region with the color of the second edge portion region.

Subsequently, in step S144, the color determining unit 214 determines whether the distance between the color of the first edge portion region and the color of the second edge portion region in the chromaticity diagram is less than the distance threshold.

In step S144, when it is determined that the distance is not less than the distance threshold (NO in step S144), the process proceeds to step S147. On the other hand, when it is determined that the distance threshold is less than the distance threshold (YES in step S144), in step S145, the changing unit 215 determines whether it is possible to change at least one of the position or the angle of the second page.

In step S145, when it is determined that the change is not possible (NO in step S145), the process proceeds to step S147. On the other hand, when it is determined that the change is possible (YES in step S145), in step S146, the changing unit 215 changes at least one of the position or the angle of the second page.

Subsequently, in step S147, the control unit 200 determines whether the condition that the distance between the color of the first edge portion region and the color of the second edge portion region in the chromaticity diagram is less than the distance threshold is satisfied, with respect to all adjacent edge portion regions. Note that that either of the color determining unit 214 or the changing unit 215 can perform the process of step S147.

In step S147, when it is determined that the condition is not satisfied with respect to all adjacent edge portion regions (NO in step S147), the process returns to step S142, and the color detecting unit 213 selects a first page out of a plurality of pages and a second page adjacent to the first page. In this case, the color detecting unit 213 selects a first page and a second page that include edge portion regions that do not satisfy the condition. Thereafter, the control unit 200 performs the processes of step S143 and beyond.

On the other hand, in step S147, when it is determined that the condition is satisfied with respect to all adjacent edge portion regions (YES in step S147), the control unit 200 ends the process.

In this manner, the control unit 200 can change the position or the angle of the plurality of pages in the print data such that the distance in the chromaticity diagram between all edge portion regions of the plurality of pages included in the print data, becomes less than the distance threshold.

Effect of the Image Forming Apparatus 103

Figure 15B:
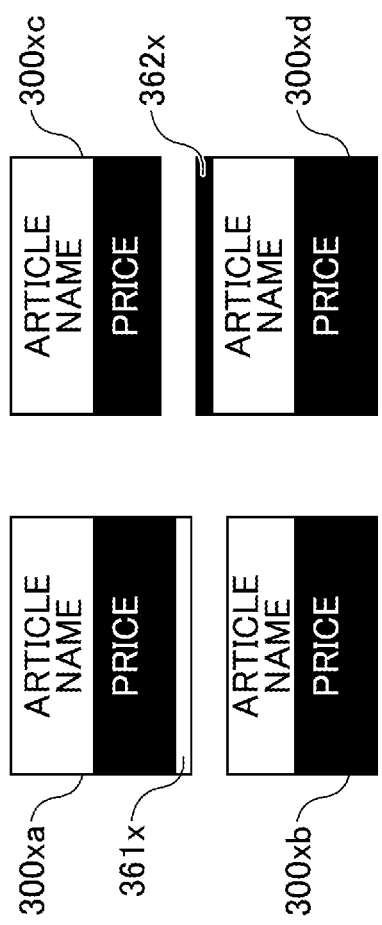
Figure 15D:
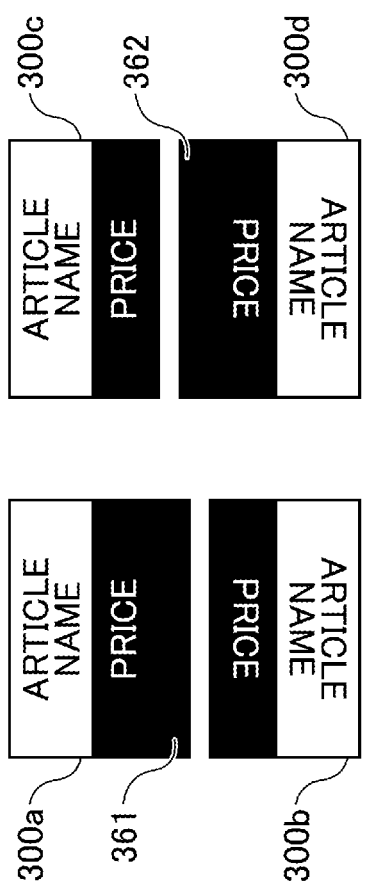
Figure 15A:
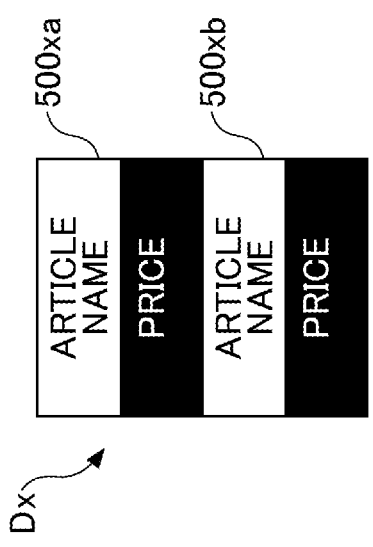
Figure 15C:
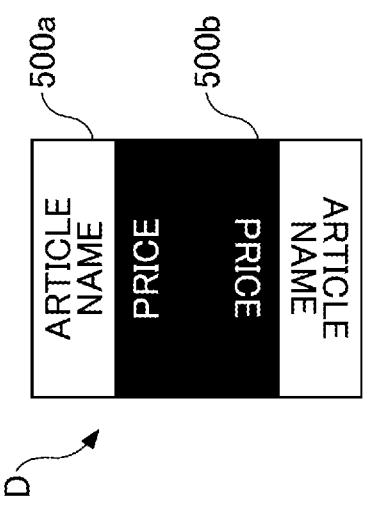

Next, an effect of the image forming apparatus 103 will be described. FIGS. 15A to 15D are diagrams illustrating examples of an image forming result. FIG. 15A is a diagram illustrating print data Dx in an image forming apparatus 103X according to a comparative example, and FIG. 15B is a diagram illustrating an image forming result based on the print data Dx. FIG. 15C is a diagram illustrating print data D in the image forming apparatus 103 according to the first embodiment, and FIG. 15D is a diagram illustrating an image forming result based on the print data D. FIG. 15B and FIG. 15D individually illustrate the pages after the print sheet, on which the images of the plurality of pages are formed, is cut up into each of the pages.

As illustrated in FIG. 15A, the print data Dx includes page data 500xa and page data 500xb. The position or the angle of these pieces of data have not been changed since the print data Dx was entered.

When an image of each page is formed on the print sheet based on the print data Dx, and the print sheet is cut up into each of the pages, as illustrated in FIG. 15B, a page image 300xa and a page image 300xb are obtained. In this example, the cutting position is deviated with respect to the boundary position of the page image 300xa and the page image 300xb when cutting the print sheet, and, therefore, the page image 300xa includes a positional deviation region 361x that is a portion of the upper edge portion region of the page image 300xb adjacent to the lower edge portion region of the page image 300xa.

The color density differs between the lower edge portion region of the page image 300xa and the upper edge portion region of the page image 300xb, and, therefore, the positional deviation region 361x included in the page image 300xa is significantly noticeable.

Further, as illustrated in FIG. 15B, the cutting position is deviated with respect to the boundary position of a page image 300xc and a page image 300xd when cutting the print sheet, and, therefore, the page image 300xd includes a positional deviation region 362x that is a portion of the lower edge portion region of the page image 300xc adjacent to the upper edge portion region of the page image 300xd.

In this case also, the color density differs between the upper edge portion region of the page image 300xd and the lower edge portion region of the page image 300xc, and, therefore, the positional deviation region 362x included in the page image 300xd is significantly noticeable.

As described above, in the image forming apparatus 103X according to the comparative example, when the cutting position is deviated, the positional deviation regions 361x and 362x or the like may be noticeable.

On the other hand, in the present embodiment, as illustrated in FIG. 15C, the print data D includes the page data 500a (first page) and the page data 500b (second page). The page data 500b is rotated by an angle of 180 degrees such that the color of the lower edge portion region (the first edge portion region) of the page data 500a and the color of the upper edge portion region (the second edge portion region) of the page data 500b satisfy a predetermined condition.

When an image of each page is formed on the print sheet based on the print data D and the print sheet is cut up into each of the pages, a page image 300a and a page image 300b are obtained as illustrated in FIG. 15D. In this example, similarly to FIG. 15B, the page image 300a includes a positional deviation region 361, which is a portion of the upper edge portion region of the page image 300b, adjacent to the lower edge portion region of the page image 300a, due to the deviation of the cutting position with respect to the boundary position of the page image 300a and the page image 300b when cutting the print sheet.

However, the page data 500b has been rotated by 180 degrees, and, therefore, the density difference of the color between the lower edge portion region of the page image 300a and the upper edge portion region of the page image 300b is less than the density threshold. Accordingly, the positional deviation region 361 included in the lower edge portion region of the page image 300a is not noticeable.

Further, as illustrated in FIG. 15D, the cutting position is deviated with respect to the boundary position of a page image 300c and a page image 300d when cutting the print sheet, and, therefore, the page image 300d includes a positional deviation region 362, which is a portion of the lower edge portion region of the page image 300c, adjacent to the upper edge portion region of the page image 300d.

In this case also, the density difference of the color between the upper edge portion region of the page image 300d and the lower edge portion region of the page image 300c is less than the density threshold, and, therefore, the positional deviation region 362 included in the upper edge portion region of the page image 300d is not noticeable.

As described above, in the image forming apparatus 103 according to the present embodiment, even when the cutting position is deviated, the positional deviation regions 361 and 362 are not noticeable. Cases where the cutting position is deviated is illustrated in FIGS. 15A to 15D, but similarly in the case where the forming position of the image of the page relative to the print sheet is deviated, the positional deviation regions 361x and 362x are noticeable in the comparison example, yet the positional deviation regions 361 and 362 are not noticeable in the present embodiment.

As described above, in the present embodiment, at least one of the position or the angle of the second page in the print data is changed such that the color of the first edge portion region of the first page and the color of the second edge portion region of the second page adjacent to the first edge portion region satisfy a predetermined condition.

Accordingly, even if there is a positional deviation in the image formation relative to the print sheet or a positional deviation in the cutting of the print sheet or the like, a portion of the second page included in the first page can be made less noticeable when the print sheet is cut up into each of the pages after the image formation.

Second Embodiment

Next, an image forming apparatus 103a according to the second embodiment will be described. The same elements as those described in the first embodiment are denoted by the same reference numerals, and overlapping descriptions are appropriately omitted.

In the present embodiment, by displaying a preview image for confirming an image to be formed based on the print data changed by the changing unit, before the image is formed, it is possible to confirm whether the print data has been changed to a desired state before the image is formed.

Example of Functional Configuration of a Control Unit 200a

Figure 16:
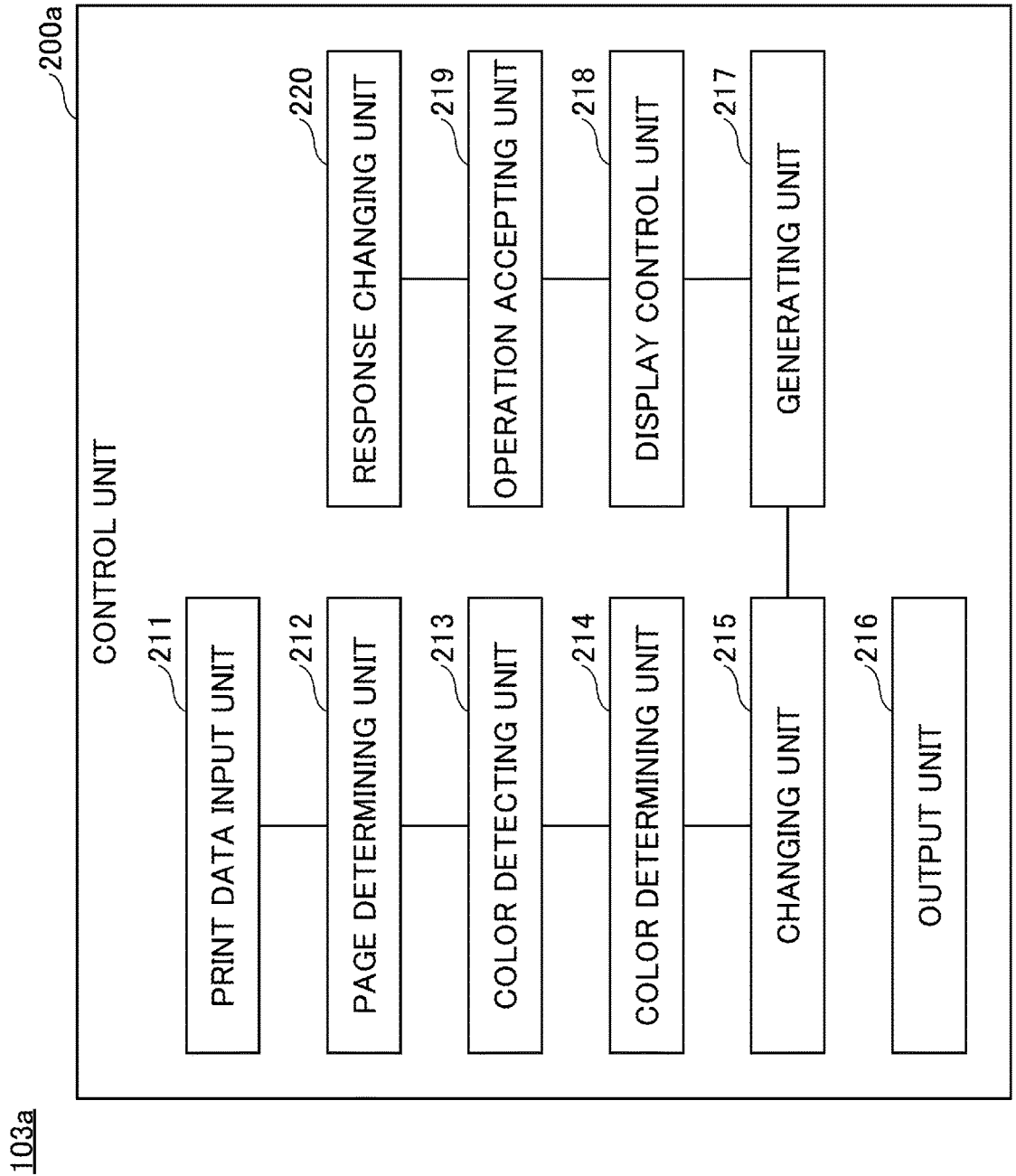
FIG. 16 is a block diagram illustrating an example of a functional configuration of a control unit according to a second embodiment of the present invention.

First, the functional configuration of the control unit 200a included in the image forming apparatus 103a will be described with reference to FIG. 16. FIG. 16 is a block diagram illustrating an example of a functional configuration of the control unit 200a. As illustrated in FIG. 16, the control unit 200a includes a generating unit 217, a display control unit 218, an operation accepting unit 219, and a response changing unit 220.

Each of these functions is implemented by, for example, the CPU 301 of FIG. 3 executing a predetermined program. Only the main elements are illustrated in FIG. 16. As such, the control unit 200a may include other elements.

The generating unit 217 generates a preview image for confirming an image to be formed based on the print data after the change by the changing unit 215, before the image is formed.

The display control unit 218 displays the preview image generated by the generating unit 217. The display control unit 218 may display the preview image on a display included in the image forming apparatus 103a or on an operation panel having a display function. However, the display is not limited thereto, and the display control unit 218 may display the preview image on a display included in the DFE 102, on an operation panel having a display function, or on a display included in the client PC 101. A user of an image forming system 100a can view the displayed preview image.

The operation accepting unit 219 accepts a change operation to the print data performed by a user who has viewed the preview image through the operation panel or the like. The response changing unit 220 changes the print data in response to a change operation accepted by the operation accepting unit 219.

Example of Preview Image

Figures 17A, 17B:
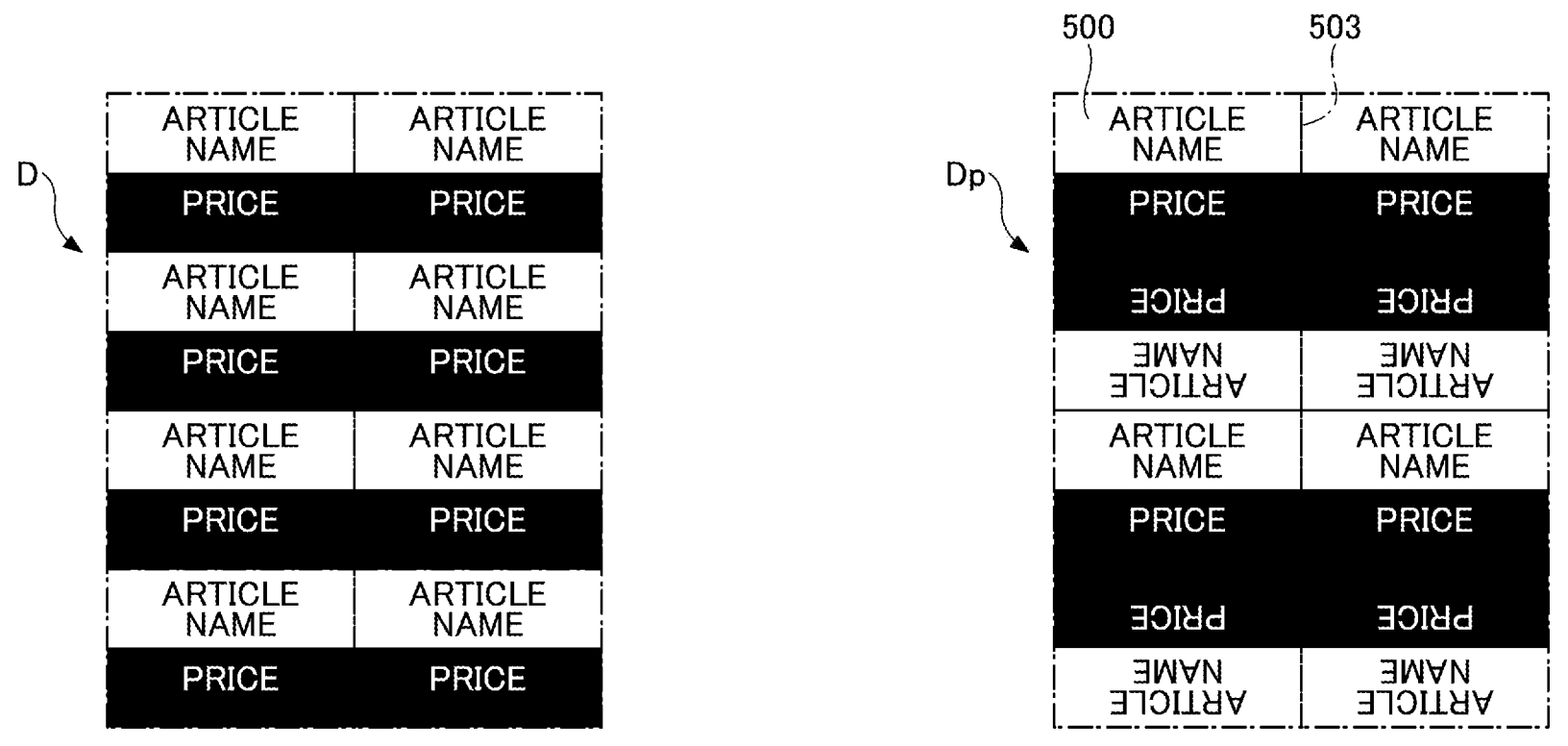

FIGS. 17A and 17B are diagrams illustrating an example of a preview image, wherein FIG. 17A is a diagram illustrating print data D and FIG. 17B is a diagram illustrating a preview image Dp.

The preview image Dp displays the result in which the position or the angle of each page in the print data D is changed by the changing unit 215, and displays the arrangement of the plurality of pieces of page data 500 and a boundary line 503 of the plurality of pieces of page data 500. The user may view the preview image Dp and change, by manual operations, the arrangement of the plurality of pieces of page data 500 or the boundary lines 503 via an operation panel or the like.

Example of Process by the Control Unit 200a

Figure 18:
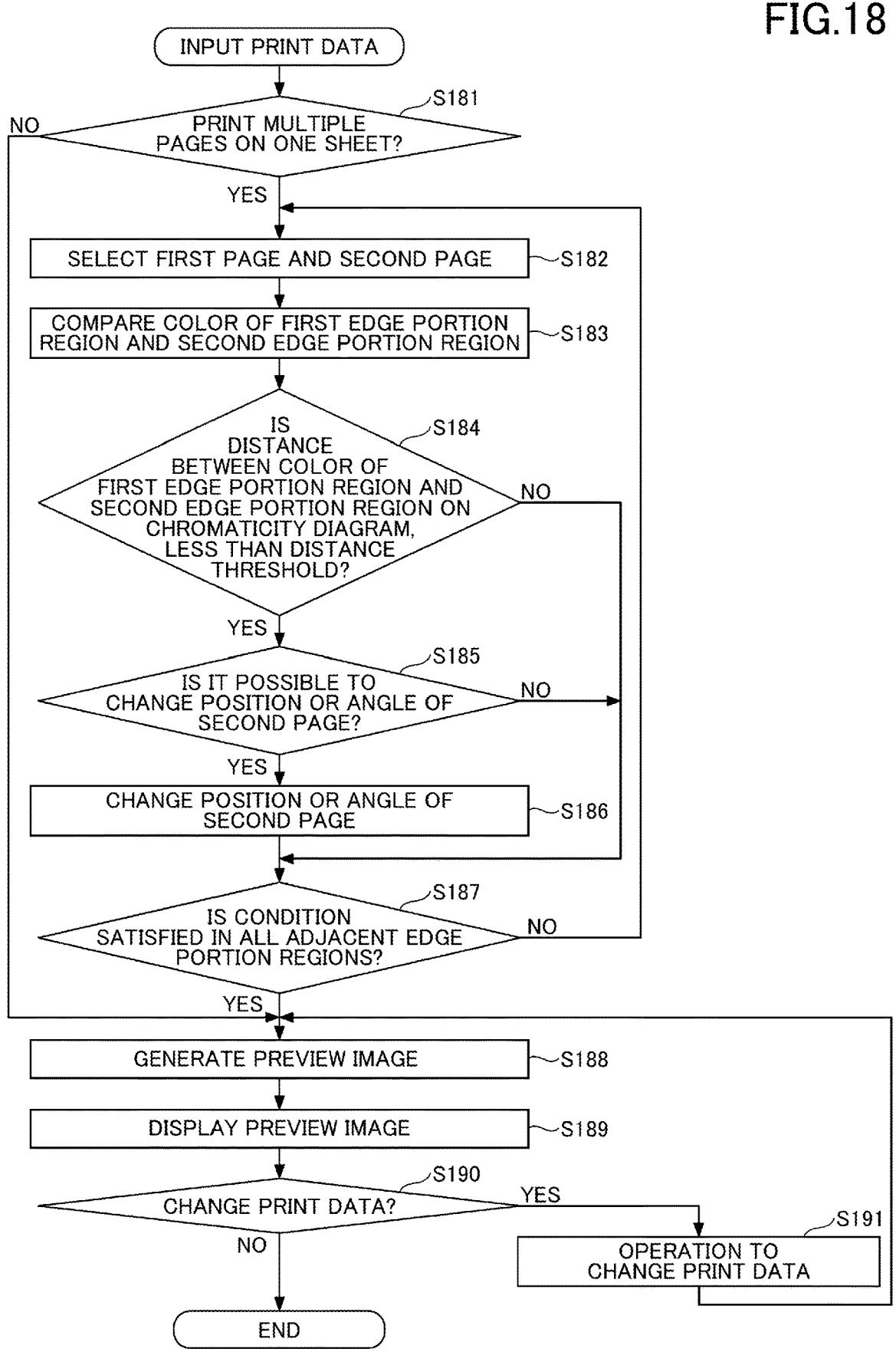
FIG. 18 is a flowchart illustrating an example of a process by the control unit according to the second embodiment of the present invention.

Next, a process by the control unit 200a will be described with reference to FIG. 18. FIG. 18 is a flowchart illustrating an example of a process by the control unit 200a. FIG. 18 illustrates a process in which the timing when the control unit 200a inputs print data from the DFE 102 is the starting point.

Further, the case where the distance between the color of the first edge portion region and the color of the second edge portion region in the chromaticity diagram is used as a predetermined condition, is illustrated. The processes of steps S181 to S187 in FIG. 18 are the same as the processes of steps S141 to step S147 in FIG. 14, and, therefore, the overlapping descriptions will be omitted here to mainly explain the differences with respect to FIG. 14. Hereinafter, the functional configuration of FIG. 16 or the like will be referred to in the description as appropriate.

In step S187, the control unit 200a determines whether the condition that the distance between the color of the first edge portion region and the color of the second edge portion region in the chromaticity diagram is less than the distance threshold is satisfied, with respect to all adjacent edge portion regions.

In step S187, when it is determined that the condition is not satisfied with respect to all adjacent edge portion regions (NO in step S187), the process returns to step S182, and the color detecting unit 213 selects a first page and a second page adjacent to the first page out of a plurality of pages.

On the other hand, in step S187, when it is determined that the condition is satisfied with respect to all adjacent edge portion regions (YES in step S187), in step S188, the generating unit 217 generates a preview image.

Subsequently, in step S189, the display control unit 218 displays the preview image generated by the generating unit 217.

Subsequently, in step S190, the operation accepting unit 219 determines whether to change the print data in accordance with the accepted operation of the user.

In step S190, when it is determined that a change is to be made (YES in step S190), in step S191, the operation accepting unit 219 accepts a change operation with respect to the print data by the user and changes the print data in response to the accepted change operation. Thereafter, the process from step S188 is performed again.

On the other hand, in step S190, when it is determined that no change is to be made (NO in step S190), the control unit 200a ends the process.

In this manner, the control unit 200a can change the position or the angle of the plurality of pages in the print data such that the distance in the chromaticity diagram between all edge portion regions of the plurality of pages included in the print data becomes less than the distance threshold, by using the preview image.

Effect of the Image Forming Apparatus 103a

As described above, in the present embodiment, a preview image Dp is displayed for confirming an image to be formed based on the print data changed by the changing unit 215, before the image is formed. This allows the user to confirm that the print data has been changed to a desired state before the image is formed, and to further change the print data more to his/her liking. Other effects are the same as those described in the first embodiment.

The image forming apparatus, the image forming method, and the image forming system are not limited to the specific embodiments described in the detailed description, and variations and modifications may be made without departing from the spirit and scope of the present invention.

In the above-described embodiment, the configuration in which the image forming apparatus 103 includes the control unit 200 and the image forming apparatus 103a includes the control unit 200a are illustrated, but the embodiments are not limited thereto. The DFE 102 may be configured to include some or all of the functions included in the control unit 200 or 200a. Alternatively, the control unit 200 or 200a may include some or all of the functions included in an external device. An external device is, for example, a cloud server.

In the above-described embodiment, the image forming system including the image forming apparatus of an electrophotographic method has been described. However, an embodiment of the present invention is also applicable to an image forming system including an image forming apparatus of another method such as an inkjet method.

Further, the values such as the ordinal numbers, quantities, or the like used in the description of the embodiments are all taken as examples for the purpose of illustrating the technology of the present invention, and the present invention is not limited to the example values. The connection relationship between the elements is taken as an example for the purpose of illustrating the technology of the present invention, and the connection relationship that achieves the function of the present invention is not limited thereto.

Also, in the functional block diagram, the division of the blocks is an example and a plurality of blocks may be implemented as one block, one block may be divided into a plurality of blocks, and/or some functions may be transferred to other blocks. The functions of multiple blocks with similar functions may be processed in parallel or by time sharing by a single piece of hardware or software.

The embodiments also include an image forming method. For example, an image forming method is a method of forming images of a plurality of pages including a first page and a second page adjacent to the first page on a single recording medium without a margin between adjacent pages based on print data. The image forming method performs a step of changing at least one of the position or the angle of the second page in the print data, such that a color of a first edge portion region of the first page and a color of a second edge portion region adjacent to the first edge portion region of the second page satisfy a predetermined condition. The same effect as the above-described image forming apparatus can be obtained by the image forming method.

The embodiments also include programs. For example, a program operates in an image forming apparatus that forms images of a plurality of pages including a first page and a second page adjacent to the first page based on print data into one recording medium without a margin between adjacent pages, and causes a computer to perform a process of changing at least one of a position or an angle of the second page on the recording medium when the color of the first edge portion region of the first page and the color of the second edge portion region of the second page adjacent to the first edge portion region do not satisfy a predetermined condition.

Alternatively, a program that operates in an information processing apparatus that arranges images of a plurality of pages including a first page and a second page adjacent to the first page in print data without a margin between adjacent pages and causes a computer to perform a process of changing at least one of a position or an angle of the second page when the color of the first edge portion region of the first page and the color of the second edge portion region of the second page adjacent to the first edge portion region do not satisfy a predetermined condition. The same effect as the above-described image forming apparatus can be obtained by the program.

Further, each of the functions of the embodiments described above may be implemented by one or more processing circuits. As used herein, a "processing circuit" includes a processor programmed to perform each function by software, such as a processor implemented in electronic circuits, an Application Specific Integrated Circuit (ASIC), a DSP (digital signal processor), a FPGA (field programmable gate array), or a conventional circuit module designed to perform each function as described above.

According to one embodiment of the present invention, a portion of an image of another page, that is included in one page, is prevented from being noticeable, when images of multiple pages are formed on a single recording medium without providing a margin between adjacent pages and then the recording medium is cut up into each of the pages.

What is claimed is:

1. An image forming apparatus configured to arrange a plurality of pages, including a first page and a second page adjacent to the first page, in print data, without providing a margin between adjacent pages in the plurality of pages, the image forming apparatus comprising:
   a changer configured to change at least one of a position or an angle of the second page, such that a color of a first edge portion region of the first page and a color of a second edge portion region, adjacent to the first edge portion region, of the second page, satisfy a predetermined condition,
   wherein the changer changes at least one of the position or the angle of the second page in the print data, such that a distance in a chromaticity diagram between the color of the first edge portion region and the color of the second edge portion region is less than a predetermined distance threshold.

2. The image forming apparatus according to claim 1, wherein the changer changes at least one of the position or the angle of the second page in the print data, such that a gradation difference between the print data of the first edge portion region and the print data of the second edge portion region is less than a predetermined gradation threshold, on a per color basis of red, green, and blue, or yellow, magenta, cyan, and black.

3. The image forming apparatus according to claim 1, wherein
   the image forming apparatus is configured to form images of the plurality of pages including the first page and the second page on both a front side and a back side of a recording medium, and
   the changer changes at least one of the position or the angle of the second page in the print data of the back side, such that the print data of the front side and the print data of the back side match each other.

4. The image forming apparatus according to claim 1, further comprising:
   a display controller configured to display a preview image for confirming an image to be formed based on the print data that has been changed by the changer, before the image is formed.

5. The image forming apparatus according to claim 1, wherein
   the image forming apparatus is configured to form, on a single recording medium, images of the plurality of pages including the first page and the second page, based on the print data, and
   the changer changes at least one of the position or the angle of the second page in the print data, such that the color of the first edge portion region of the first page and the color of the second edge portion region, adjacent to the first edge portion region, of the second page, satisfy the predetermined condition.

6. An image forming method for forming, on a single recording medium, images of a plurality of pages, including a first page and a second page adjacent to the first page, based on print data, without providing a margin between adjacent pages in the plurality of pages, the image forming method comprising:

changing at least one of a position or an angle of the second page in the print data, such that a color of a first edge portion region of the first page and a color of a second edge portion region, adjacent to the first edge portion region, of the second page, satisfy a predetermined condition, wherein the changing at least one of the position or the angle of the second page in the print data is performed, such that a distance in a chromaticity diagram between the color of the first edge portion region and the color of the second edge portion region is less than a predetermined distance threshold.

7. A non-transitory computer-readable recording medium storing a program that causes a computer to execute the image forming method according to claim 6.

8. An image forming system comprising an image forming apparatus configured to form an image on a recording medium based on print data; and an image processing apparatus configured to transmit the print data to the mage forming apparatus, wherein the image forming apparatus forms, of a single one of the recording medium, the images of a plurality of pages, including a first page and a second page adjacent to the first page, based on the print data, without providing a margin between adjacent pages in the plurality of pages, and changes at least one of a position or an angle of the second page in the print data, such that a color of a first edge portion region of the first page and a color of a second edge portion region, adjacent to the first edge portion region, of the second page, satisfy a predetermined condition, wherein the image forming apparatus changes at least one of the position or the angle of the second page in the print data, such that a distance in a chromaticity diagram between the color of the first edge portion region and the color of the second edge portion region is less than a predetermined distance threshold.

* * * * *